US012604137B2

(12) United States Patent
Pentecost et al.

(10) Patent No.: US 12,604,137 B2
(45) Date of Patent: Apr. 14, 2026

(54) BEAMFORMED MICROPHONE ARRAY

(71) Applicant: Dotterel Technologies Limited, Auckland (NZ)

(72) Inventors: Shaun Taggart Pentecost, Taipuha (NZ); Samuel Seamus Rowe, Auckland (NZ); Shaun Edlin, Auckland (NZ); Matthew Rowe, Auckland (NZ); Hin Loh, Auckland (NZ); Mark Poletti, Wellington (NZ)

(73) Assignee: Dotterel Technologies Limited, Auckland (NZ)

( * ) Notice: Subject to any disclaimer, the term of this patent is extended or adjusted under 35 U.S.C. 154(b) by 221 days.

(21) Appl. No.: 18/247,433

(22) PCT Filed: Sep. 30, 2021

(86) PCT No.: PCT/NZ2021/050167
§ 371 (c)(1),
(2) Date: Mar. 30, 2023

(87) PCT Pub. No.: WO2022/071812
PCT Pub. Date: Apr. 7, 2022

(65) Prior Publication Data

US 2024/0007786 A1 Jan. 4, 2024

(30) Foreign Application Priority Data

Oct. 1, 2020 (NZ) ........................................ 767567

(51) Int. Cl.
*H04R 1/40* (2006.01)
*G10L 21/0216* (2013.01)
(Continued)

(52) U.S. Cl.
CPC ............... *H04R 1/40* (2013.01); *H04R 3/005* (2013.01); *H04R 2201/403* (2013.01)

(58) Field of Classification Search
CPC .......... H04R 1/40; H04R 3/005; H04R 29/00; H04R 2430/20; G10L 2021/02166
(Continued)

(56) References Cited

U.S. PATENT DOCUMENTS 5,627,799 A 5/1997 Hoshuyama
5,737,485 A * 4/1998 Flanagan ................ G10L 15/16 704/E15.017

(Continued)

FOREIGN PATENT DOCUMENTS

CN 109493844 A 3/2019
JP 3216704 B2 10/2001

(Continued)

OTHER PUBLICATIONS

Foreign Communication from a Related Counterpart Application, Extended European Search Report dated Jan. 3, 2025, European Application No. 21876066.8 filed on Apr. 7, 2022.

(Continued)

*Primary Examiner* — Thjuan K Addy
(74) *Attorney, Agent, or Firm* — Conley Rose, P.C.

(57) ABSTRACT

According to a first aspect of the invention, there is provided a method of beamforming for a linear microphone array comprising: storing a desired end-fire beam response including a beamwidth specification; determining an error data set from the stored end-fire beam response; and determining beamforming weights based on a least squares minimisation of the error data set. There are also provided a system, a microphone array, and an apparatus.

20 Claims, 19 Drawing Sheets

(51) Int. Cl.
*H04R 3/00* (2006.01)
*H04R 29/00* (2006.01)

(58) Field of Classification Search
USPC .......................................... 381/92, 94.1, 300
See application file for complete search history.

(56) References Cited

U.S. PATENT DOCUMENTS

| | | | | |
|---|---|---|---|---|
| 6,002,776 | A | 12/1999 | Bhadkamkar et al. | |
| 7,289,586 | B2 | 10/2007 | Hui | |
| 8,755,536 | B2 | 6/2014 | Chen et al. | |
| 9,438,972 | B2 | 9/2016 | Wang et al. | |
| 9,591,404 | B1 | 3/2017 | Chhetri | |
| 9,882,277 | B2 | 1/2018 | Henry et al. | |
| 9,889,931 | B2 | 2/2018 | Xu et al. | |
| 9,980,042 | B1 * | 5/2018 | Benattar | H04R 25/407 |
| 10,136,234 | B2 | 11/2018 | Di Censo et al. | |
| 10,249,286 | B1 | 4/2019 | Mani | |
| 10,274,129 | B2 | 4/2019 | Saika et al. | |
| 10,433,086 | B1 * | 10/2019 | Juszkiewicz | H04R 29/002 |
| 10,540,986 | B2 | 1/2020 | Glasgow et al. | |
| 2004/0001137 | A1 | 1/2004 | Cutler et al. | |
| 2004/0175006 | A1 | 9/2004 | Kim et al. | |
| 2005/0271221 | A1 | 12/2005 | Cerwin | |
| 2007/0050441 | A1 | 3/2007 | Taenzer et al. | |
| 2009/0175466 | A1 | 7/2009 | Elko et al. | |
| 2012/0330653 | A1 | 12/2012 | Lissek et al. | |
| 2016/0005408 | A1 | 1/2016 | Visser et al. | |
| 2016/0084729 | A1 | 3/2016 | Huseynov et al. | |
| 2017/0026728 | A1 | 1/2017 | Elko | |
| 2018/0227666 | A1 | 8/2018 | Barnett et al. | |
| 2019/0259366 | A1 | 8/2019 | Hansson | |
| 2020/0221220 | A1 | 7/2020 | Benattar | |
| 2021/0256987 | A1 | 8/2021 | Edlin et al. | |

FOREIGN PATENT DOCUMENTS

| | | | |
|---|---|---|---|
| WO | 2010092568 | A1 | 8/2010 |
| WO | 2017131845 | A1 | 8/2017 |
| WO | 2018055232 | A1 | 3/2018 |
| WO | 2019/221613 | A1 | 11/2019 |
| WO | 2022071812 | A1 | 4/2022 |

OTHER PUBLICATIONS

Foreign Communication from a Related Counterpart Application, Partial European Search Report and Written Opinion dated Oct. 4, 2024, European Application No. 21876066.8 filed on Apr. 7, 2022.

Foreign Communication from a Related Counterpart Application, International Search Report and Written Opinion dated Dec. 22, 2021, International Application No. PCT/NZ2021/050167 filed on Sep. 30, 2021.

Rasumow, E, et al., "Regularization approaches for synthesizing HRTF directivity patterns", IEEE Transactions on Audio, Speech and Language Processing, vol. 24, No. 2, Feb. 2016, pp. 215-225.

Mabande, E, et al., "Design of robust superdirective beamformers as a convex optimization problem", 2009 IEEE International Conference on Acoustics, Speech and Signal Processing, Taibei, Taiwan, Apr. 19-24, 2009.

* cited by examiner

BEAMFORMED MICROPHONE ARRAY

CROSS-REFERENCE TO RELATED APPLICATIONS

The present application is a filing under 35 U.S.C. 371 as the National Stage of International Application No. PCT/NZ2021/050167, filed Sep. 30, 2021, entitled "BEAMFORMED MICROPHONE ARRAY," which claims priority to New Zealand Application No. 767567 filed with the Intellectual Property Office of New Zealand on Oct. 1, 2020, both of which are incorporated herein by reference in their entirety for all purposes.

FIELD

This invention relates to a beamformed microphone array.

BACKGROUND

In many applications in acoustics, it is desirable to detect an incoming sound wave arriving from one direction, while ignoring or suppressing sound waves that arrive from other directions. This can be achieved if a transducer (microphone) is used which has a directional response, so that its output amplitude varies with the angle of arrival of the sound wave. This property of the transducer is known as directivity.

A directional response can be obtained using a plurality (equivalently an 'array') of microphones positioned over a specified area of space and combine their outputs to produce a single output. The operation of a microphone array is governed by the way that the microphones are combined. In the simplest case the outputs are simply added together. For example, linear and 2D planar arrays produce a maximum response for plane waves where the wave fronts are coincident with, and produce identical phases at, the microphones. In the more general case, each microphone signal is modified by altering its amplitude and phase at each given frequency and then the modified outputs are added. The resulting directional characteristics of the array depend on the positions of the microphones and the amplitude and phase shifts applied to each microphone output. This technique is generally known as beamforming.

SUMMARY

According to a first aspect of the invention, there is provided a method of beamforming for a linear microphone array comprising: storing a desired end-fire beam response including a beamwidth specification; determining an error data set from the stored end-fire beam response; and determining beamforming weights based on a least squares minimisation of the error data set.

In an example embodiment of the first aspect of the invention, there is provided the method of any one of the originally filed dependent claims that depends from the first aspect of the invention.

According to a second aspect of the invention, there is provided a system comprising: a processing unit; and a microphone array comprising a plurality of MEMS microphones; wherein the processing unit is configured to receive audio from the plurality of MEMS microphones and apply beamforming to the received audio to generate an end-fire beam.

In an example embodiment of the second aspect of the invention, there is provided the system of any one of the originally filed dependent claims that depends from the second aspect of the invention.

According to a third aspect of the invention, there is provided a microphone array comprising: a plurality of circuit boards formed in a three-dimensional structure; wherein at least one of the plurality of circuit boards includes one or more microphones.

In an example embodiment of the third aspect of the invention, there is provided the microphone array of any one of the originally filed dependent claims that depends from the third aspect of the invention.

According to a fourth aspect of the invention, there is provided an apparatus comprising a linear microphone array; a plurality of filters, each filter is configured to receive a respective output signal from the microphone array, each filter is configured to have at least one associated coefficient or constant, and wherein a plurality of filtered signals output from each of the plurality of filters are configured to be combined into a smaller subset of beamformer outputs, and a user beamformer selection input configured to receive a user selection, and depending on the selection to adjust the coefficient or constant associated with each filter to achieve a desired smaller subset of beamformer outputs and/or resulting beamforming pattern.

According to a fifth aspect of the invention, there is provided an apparatus comprising a three-dimensional microphone housing; a plurality of linear microphone arrays within the housing; a control housing; a data connection between the microphone housing and the control housing; a processor within the control housing or the microphone housing configured to form an end-fire beam response from the outputs of the plurality of linear microphone arrays; and one or more user input devices on the control housing configured to adjust the end-fire beam.

According to a sixth aspect of the invention, there is provided an audio processing system comprising a data collections device for capturing 10 or more simultaneous audio channels from a plurality of linear microphone arrays; and a remote data storage and processing server configured to receive the raw or minimally processed audio channel data, to receive user input about a desired beam pattern and to process the audio channel data to output the desired beam pattern.

According to a seventh aspect of the invention, there is provided an apparatus comprising a plurality of linear microphone arrays; a plurality of filters, each filter is configured to receive a respective output signal from the microphone array, each filter is configured to have at least one associated coefficient or constant, and wherein a plurality of filtered signals output from each of the plurality of filters are configured to be combined into a smaller subset of beamformer outputs, and an output providing an end-fire beam response from the outputs of the plurality of linear microphone arrays, wherein the sidelobe response of the output is considerably lower than an interference tube shotgun mic.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

Figure 1:
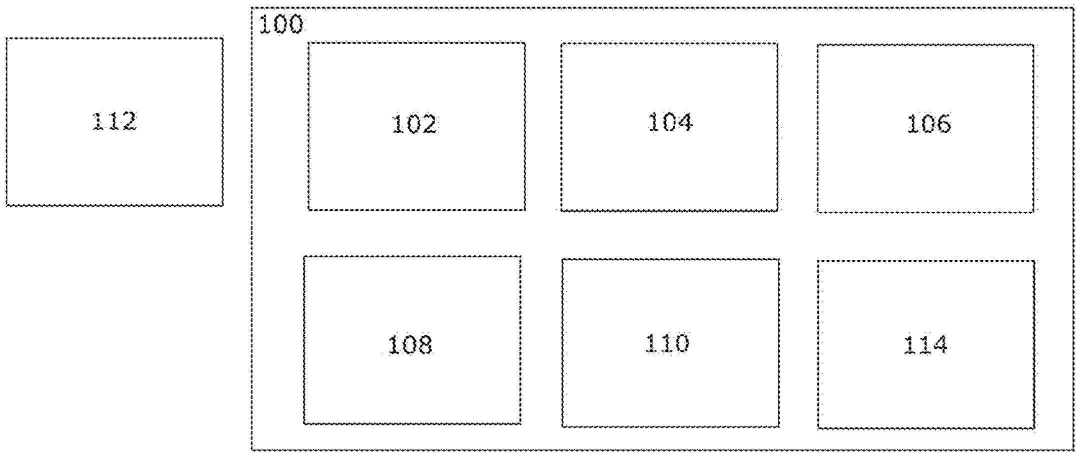
FIG. 1 is a block diagram of a beamformed microphone array system according to one example embodiment.

FIG. 1 shows a block diagram of beamformed microphone array system 100 according an example embodiment. The blocks indicate only the key components concerned with data (signal) and power flow.

The microphones 102 of the microphone array system 100 act as transducers, converting physical sound pressure to an electrical signal. In some embodiments, the electrical signal is an analogue signal, that is, a voltage waveform. While in other embodiments, the microphones themselves are equipped with analogue-to-digital converters, so that the microphone outputs are already represented digitally. In use, the microphones may capture both target (desirable) audio from one or more target audio sources and noise from one more noise sources.

The circuitry block 104 encompasses electronic circuitry that support the signal flow or flows. Functionalities provided by the circuitry 104 may include, but are not limited to, pre-amplification of audio signals captured by the microphones 102; analogue filtering of said audio signals; analogue-to-digital conversion of said audio signals; and control of signal flow between elements within the circuitry block 104, or signal flows between blocks such as the flow from microphones 102 to a processing unit 108. The data flow may be implemented serially. As a non-limiting example, the signal flow comprises one or more serial streams in a time-division multiplexed (TDM) form. The circuitry block 104 may then provide timing and/or error detection (correction) functionalities in accordance with a suitable protocol. In one embodiment, the circuitry block 104 ensures that all microphones are sampled at substantially the same instant in time.

Other blocks in the microphone array system 100 may all be connected to a processing unit 108. The processing unit 108 may be configured to receive inputs from the various blocks, to process information, and to produce outputs that control the operation of the various blocks in the system 100. Most notably, the processing unit 108 may comprise a beamformer configured to perform beamforming on the outputs of the microphones 102. On a related note, the processing unit 108 may also execute a noise-filtering (removing noise from captured audio to produce target audio) algorithm that incorporates the beamforming, as will be explained in detail hereinafter. For simplicity, the processing unit 108 is shown in FIG. 1 as a single block, but it may be divided into multiple modules, some of which may overlap with the other blocks shown. For example, some of the control functionalities may be provided by the circuitry block 104. Additionally, the processing unit 108 may comprise a plurality of processing units. At least in the case of processing units, the singular should be interpreted as including the plural.

In a non-limiting sense, the processing unit 108 may comprise one or more of: a field programmable gate array (FPGA), an application-specific integrated circuit (ASIC), a digital signal processor (DSP), a general purpose computer, or a microcontroller or microprocessor including a central processing unit (CPU).

The system 100 may also include a communications module 110. The communications module 110 may be configured for unidirectional or bidirectional (depending on the particular application) communication with a remote processing unit 112, depicted as a block distinct from the system 100. The remote processing unit 112 contrasts the processing unit 108, which may be in the same physical package as and thus integral to the microphone array system 100. In one embodiment, the remote processing unit 112 is a ground station. Such communication may be by any suitable wired or wireless communication protocol. In embodiments where the remote processing unit 112 is used, the processing unit 108 and the remote processing unit 112 may collectively handle the processing or computation load required by the system 100, either independently or cooperatively. Though not shown in FIG. 1, the communications module 110 may be configured to communicate with functional blocks or devices other than the remote processing unit 112.

In a non-limiting sense, the remote processing unit 112 may comprise one or more of a field programmable gate array (FPGA), an application-specific integrated circuit (ASIC), a digital signal processor (DSP), a general purpose computer, or a microcontroller or microprocessor including a central processing unit (CPU). The system 100 may also include a power block 114. The power block 114 may comprise a power source configured to supply power to the various blocks of the system 100. The power source may be a battery, which may be replaced and/or recharged. The power block 114 may also comprise any sensing or control that support the operation of powering the system 100. While the power block 114 is shown as part of the microphone array system 100, it may also supply power to another block or device belonging to a larger overarching system of which the microphone array system 100 is a subsystem. However, using the power block 114 solely for the system 100 may be desirable for decoupling any noise present in the another block or device, so as to not compromise the quality of signals in the system 100 and thus not compromise the quality of the noise-filtering.

The system 100 may partially or completely process audio and noise to produce filtered target audio using the noise-filtering algorithm. Alternatively, the system 100 may store audio and noise data or transmit said data to an external storage for post-processing. The system 100 may additionally include a data storage component 106 which stores data collected and/or processed by the processing unit 108, thereby providing flexibility in terms of where and when the processing might occur. In one embodiment, the data storage component may store data when connectivity is lost between the system 100 and a remote processing unit 112, for transmission at a later time when connectivity is restored. The data storage component 106 may be an SD (secure digital) card or an SSD (solid-state drive). Whether the noise-filtering should occur in real-time (relative to post-processing) or be part of post-processing will depend on the particular application. For example, the captured audio may need to be broadcasted on a live stream. In this case, it may be desirable to perform noise-filtering in real-time so that filtered target audio may be broadcasted in a timely manner on the live stream.

A user may control the operation of the beamformed microphone array system 100 by issuing a command to the system 100 via the communications module 110. The extent of the control may include, but is not limited to, adding or removing beamformer outputs (how many beams are beamformed), gain adjustment, volume adjustment, power toggle, and troubleshooting. The control may be applied to all the microphones in the array in a single operation. Alternatively, the control may be applied to a subset of microphones as separate operations.

Microphone Array

Figure 2:
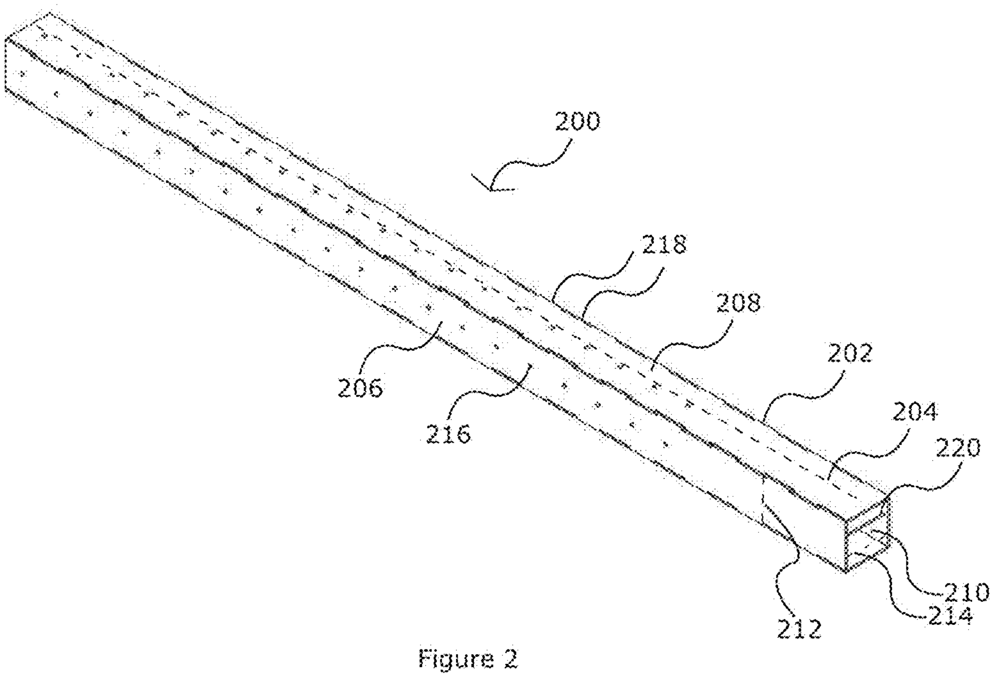
FIG. 2 is a perspective view of a physical microphone array according to one example embodiment.

FIG. 2 shows an embodiment of the physical microphone array 200. In this embodiment, the microphone array 200 is a linear array assuming the form of a three-dimensional elongated cuboid structure 202. The longest dimension (length) of the microphone array 200 defines an axis 204 of the microphone array 200, such that the microphone array 200 is substantially axisymmetric about a central axis parallel to the axis 204. On each of the four larger sides (206, 208 and their opposite sides) of the cuboid structure 202, there are disposed thereon a plurality of microphones (not visible in FIG. 2) on the interior, that is, an inward-facing surface of the cuboid structure 202. In this embodiment, each hole of the holes 216 on the exterior of the cuboid structure 202 corresponds to a microphone on the interior of the cuboid structure 202 at the same position, and so each of the four larger sides comprises 20 microphones. However, each of the four larger, microphone-bearing sides may comprise any number of microphones. In the embodiment of FIG. 2, the end 210 is substantially open. Alternatively, the end 210 and/or the other end (side opposite 210) may be substantially closed, each with an end board.

It may be preferable to size the cuboid structure 202 to have a similar form factor to existing shotgun microphones in order that it be compatible with microphone accessories, such as boom stands and windsocks, that are readily available in the market. Sizing the cuboid structure 202 to match existing shotgun microphones may also give a user a sense of familiarity.

Related to the dimensions is the weight of the microphone array 200. As shown in FIG. 2, the design of the cuboid structure 202 is substantially hollow which may contribute to the array having a lighter weight. A compact, lightweight microphone array may be preferred in applications where the microphone array is disposed on a movable carrier such as an unmanned aerial vehicle, so as to minimise the load on the carrier.

The cuboid structure 202 may be substantially elongated, such that the cuboid structure is substantially longer than it is higher. For example, the length 204 to width 214 ratio and the length 204 to height 212 ratio may each be at least 10 and the width 214 to height 212 ratio may be about 1. There may only be a single line of microphones on each of the microphone-bearing sides. Configured this way, the microphone array 200 is said to be a linear array. Compared to other array geometries such as a planar array or a spherical array, the linear array may be preferable for beamforming an end-fire beam (discussed in more detail hereinafter), for it provides a symmetric response about the array axis with high directivity in a compact form factor. Such an elongated design may also offer better aerodynamic characteristics compared to a planar array in applications where the microphone array 200 is disposed on a movable carrier.

There may additionally be assemblage tabs and slots 218 along the edges of the microphone array 200, provided to facilitate assembly of the microphone array 200.

The microphone array 200 may be composed of a plurality of circuit boards, which may be printed circuit boards (PCBs). One or more sides of the microphone array may each be a PCB, adjoined to one another at the edges of the array structure to form a three-dimensional structure that is substantially hollow. In one embodiment, each of the four larger, microphone-bearing sides is a circuit board having mounted thereon a plurality of microphones and circuitry 104. Where the three-dimensional structure has clearly defined closed ends, the end boards may also be circuit boards comprising circuitry 104 but may not comprise any microphones.

There may additionally be provided a circuit board 220 within the three-dimensional structure. The circuit board 220 may have mounted thereon circuitry 104 and/or a processing unit 108.

Though not visible in FIG. 2, any of the circuitry 104 or the processing unit 108 of circuit board 220 may be connected to and in communication with microphones or circuitry of another circuit board of the microphone array 200.

In one embodiment, the circuit boards are rigid (hard) circuit boards. The rigidity may be such that a circuit board has a bend radius of no more than 1 mm. Forming the microphone array 200 with rigid circuit boards may be acoustically beneficial. If one or more of the circuit boards making up the microphone array 200 were flexible, the corresponding side or sides of the microphone array 200 may be prone to vibrations at certain modal frequencies of the dynamical system defined by the structural properties of the microphone array 200 and any excitation sound waves. The net effect may be such that the microphone array 200 would generate its own sound field at the modal frequencies, which would then compromise the performance of the microphone array 200 and hence the performance of the beamformed microphone array system 100. In an embodiment where rigid circuit boards are used, there is a lower risk of modal frequencies occurring in the audio frequency range, thereby making the microphone array 200 and hence the beamformed microphone array system 100 more robust in terms of acoustical performance. There may still be some modal vibrations, even with rigid circuit boards. However, these modal frequencies may be too high, and their vibration amplitudes too small, to pose a notable problem for most audio recording applications.

In some embodiments, the beamformer may model diffraction behaviours around the edges and vertices of the microphone array 200, e.g. using the boundary element method (BEM). The boundary element method assumes there is no mechanical vibration of the microphone array 200. Any results obtained for a modally vibrating microphone array 200 using BEM may therefore be inaccurate, which would then affect the beamformer outputs. The finite element method (FEM) accounts for both mechanical vibration and acoustics but requires a 3D mesh of the air around the microphone array 200 and a model of the microphone array 200 itself, whereas BEM only requires a 2D mesh. It is therefore a further advantage of rigid circuit boards that they allow the simpler BEM to be used for modelling diffraction behaviours.

A still further advantage of rigid circuit boards may be present in embodiments where coherent averaging is performed on the microphone outputs (explained in more detail hereinafter). Vibrations of the microphone array 200 may result in the microphones receiving slightly different signals, which would impair the noise-to-signal ratio improvement effected via coherent averaging.

While the microphone array examples described herein generally relate to a three-dimensional elongated cuboid structure, any combination of microphone circuit boards and end boards could be used to form a variety of three-dimensional microphone array structures as appropriate. For example, three microphone circuit boards with two triangular end boards could be used to form a microphone array assuming the form of a triangular prism. Similarly, five or six microphone circuit boards with two pentagonal or hexagonal end boards could be used to form a structure resembling a pentagonal prism or a hexagonal prism respectively.

It may be desirable to use a many-sided polygonal prism to approximate a cylindrical three-dimensional structure, which is more amenable to mathematical analysis as far as diffraction behaviours, though a many-sided polygonal prism may incur practical manufacturing difficulties.

Figure 21A:
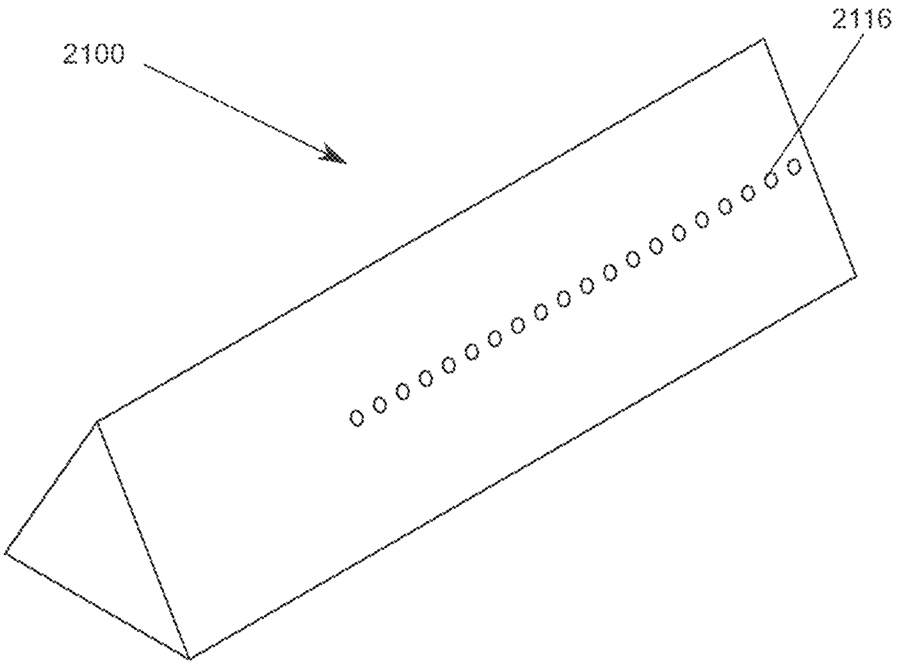
FIGS. 21*a-c* are a series of views of a 3 sided microphone array housing.
Figure 21B:
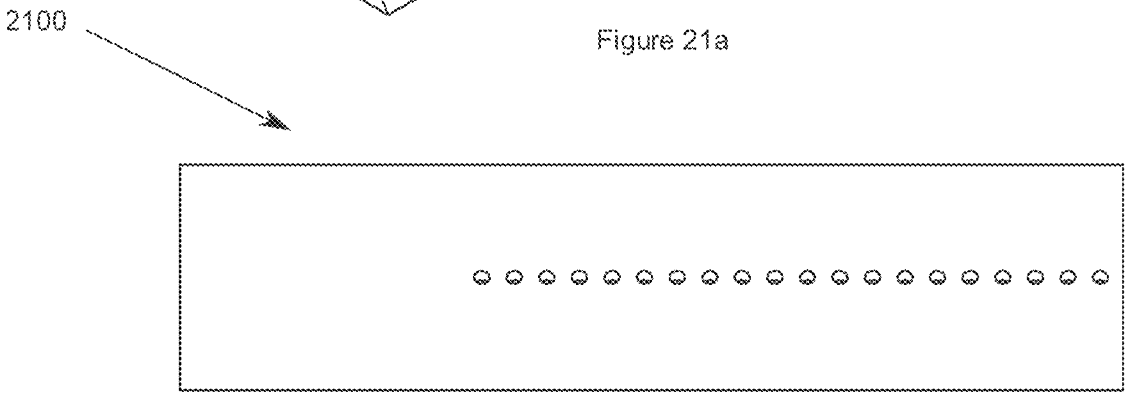
Figure 21C:
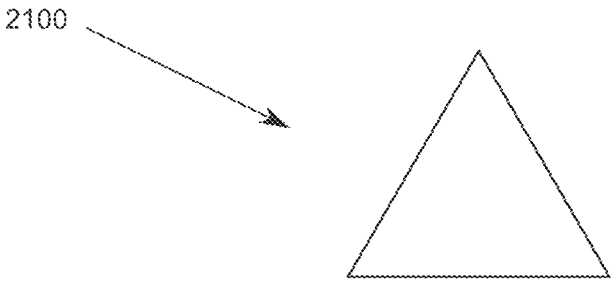
Figure 22A:
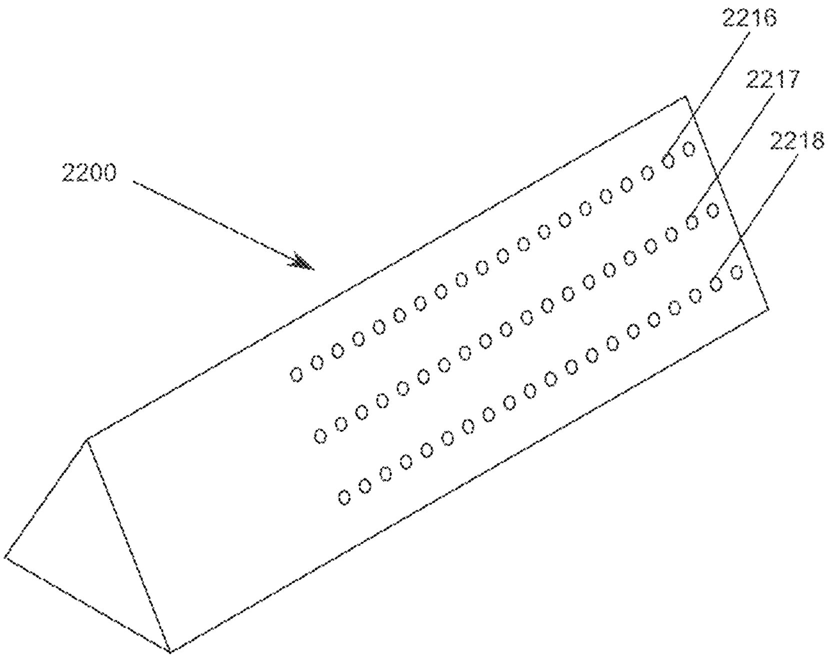
FIG. 22*ac-c* are a series of views of a 3 sided microphone array housing with multiple arrays per side.
Figure 22B:
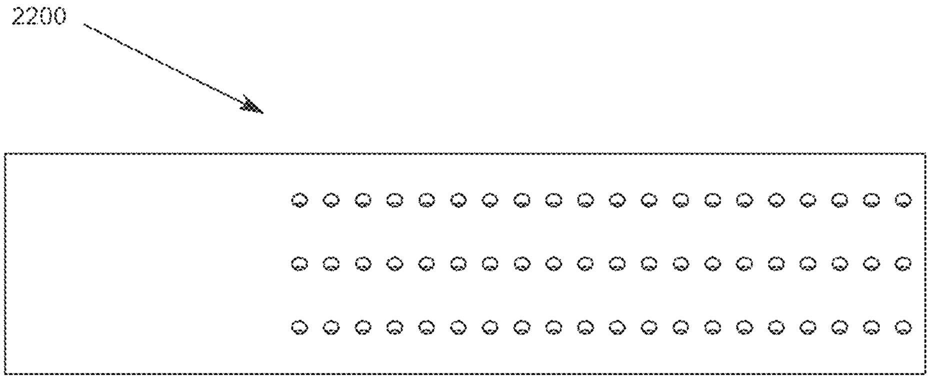
Figure 22C:
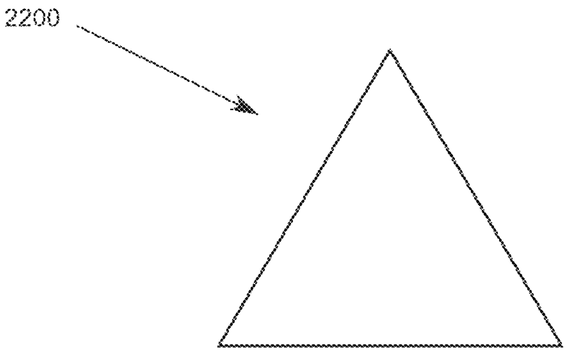
Figure 23A:
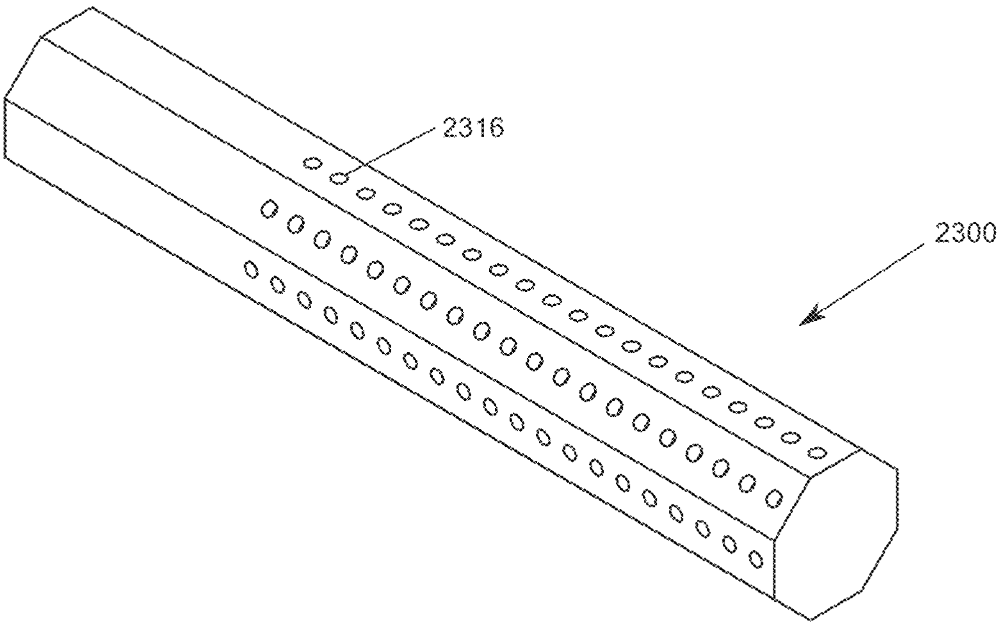
FIGS. 23*a-c* are a series of views of a 8 sided microphone array housing.
Figure 23B:
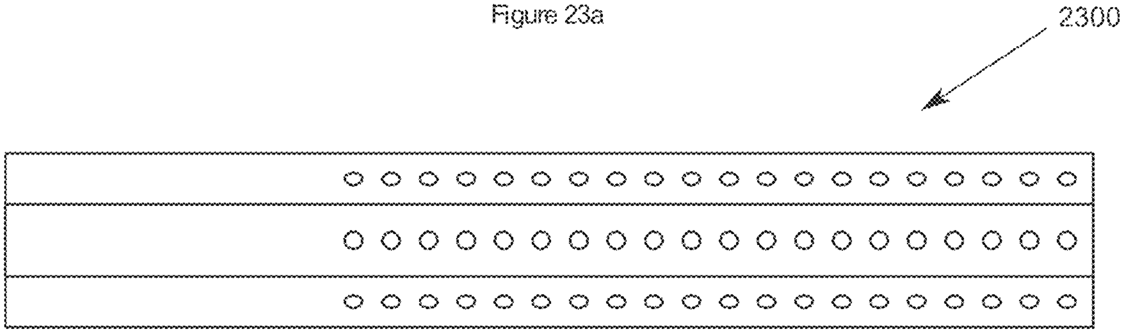
Figure 23C:
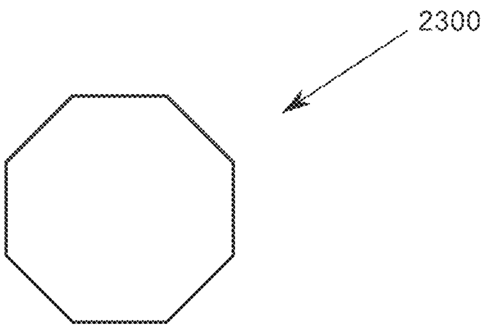

One example microphone housing shown in FIG. 2 is a four-sided elongate cuboid with each long side containing at least a single line array of MEMS microphones. A MEMS microphone is omnidirectional in polar response, but in practical application when affixed to a PCB the mechanical surroundings interfere with the polar response. Utilizing four sides of MEMS elements gives the ability to better approximate the omnidirectional ideal response of a singular MEMS element in free space in the non end-fire directions. Alternatively, as shown in FIGS. 21*a*, 21*b*, and 21*c* the housing may have 3 long sides, or may have 8 long sides as shown in FIGS. 23*a*, 23*b*, and 23*c*. FIGS. 22*a*, 22*b*, and 22*c* show a further alternative with multiple linear microphone arrays on each long side.

FIGS. 21*a*, 21*b*, and 21*c* show a 3 sided microphone array 2100 shaped as a triangular prism. To avoid confusion the '3 sided' refers to the microphone array having 3 microphone bearing sides, which are the rectangular sides of the triangular prism. A single linear microphone array is longitudinally disposed on the interior of each of the microphone bearing sides. The positions of the microphones match their corresponding holes 2116.

FIGS. 22*a*, 22*b*, and 22*c* show a further 3 sided microphone array 2200 shaped as a triangular prism. Microphone array 2200 differs from microphone array 2100 in that it comprises multiple linear microphone arrays on each of the 3 microphone bearing sides. In the embodiment shown, each side comprises 3 linear microphone arrays, though there may be a different number of linear microphone arrays (at least two) on each microphone bearing side in a different embodiment. Correspondingly, there are three rows of holes 2216, 2217, and 2218 on each of the three microphone bearing sides, each row of holes matching a respective linear microphone array.

FIGS. 23*a*, 23*b*, and 23*c* show an 8 sided microphone array 2300 shaped as a octagonal prism. To avoid confusion the '8 sided' refers to the microphone array having 8 microphone bearing sides, which are the rectangular sides of the octagonal prism. A single linear microphone array is longitudinally disposed on the interior of each of the microphone bearing sides. The positions of the microphones match their corresponding holes 2316.

Figure 24A:
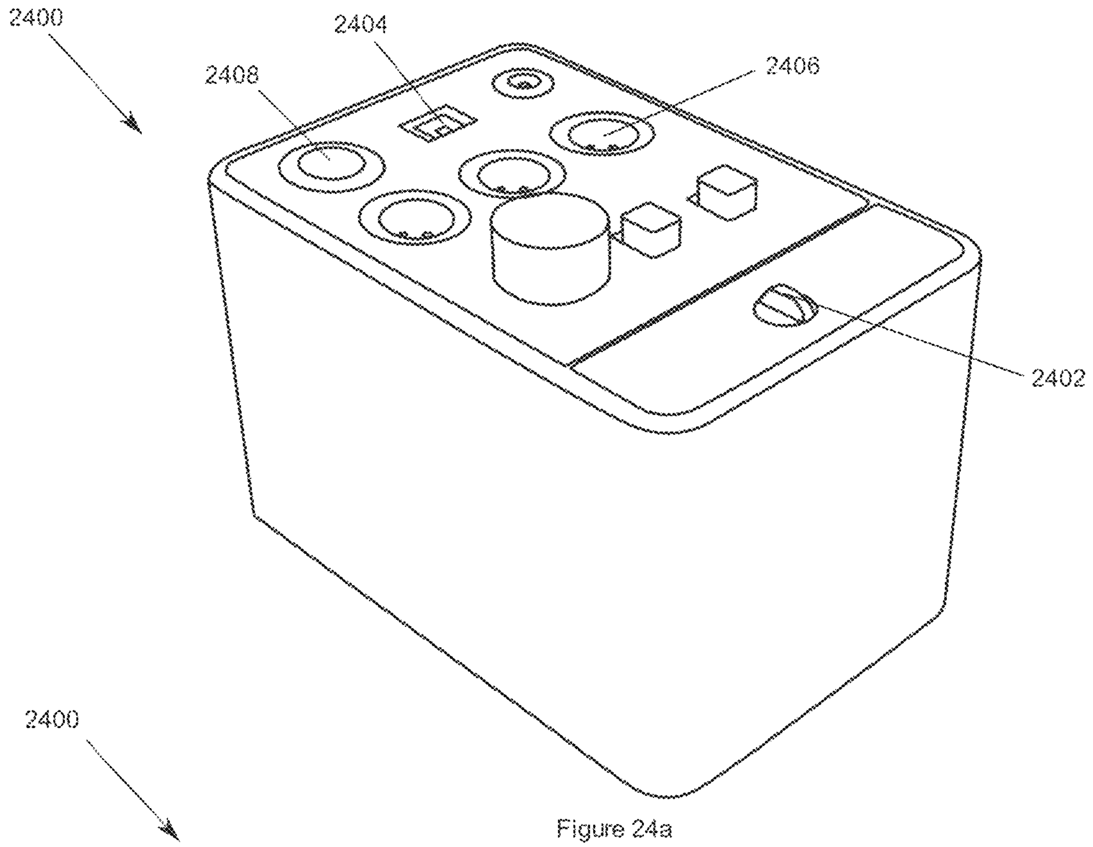
FIG. 24*a* is a perspective view of a processor housing.
Figure 24B:
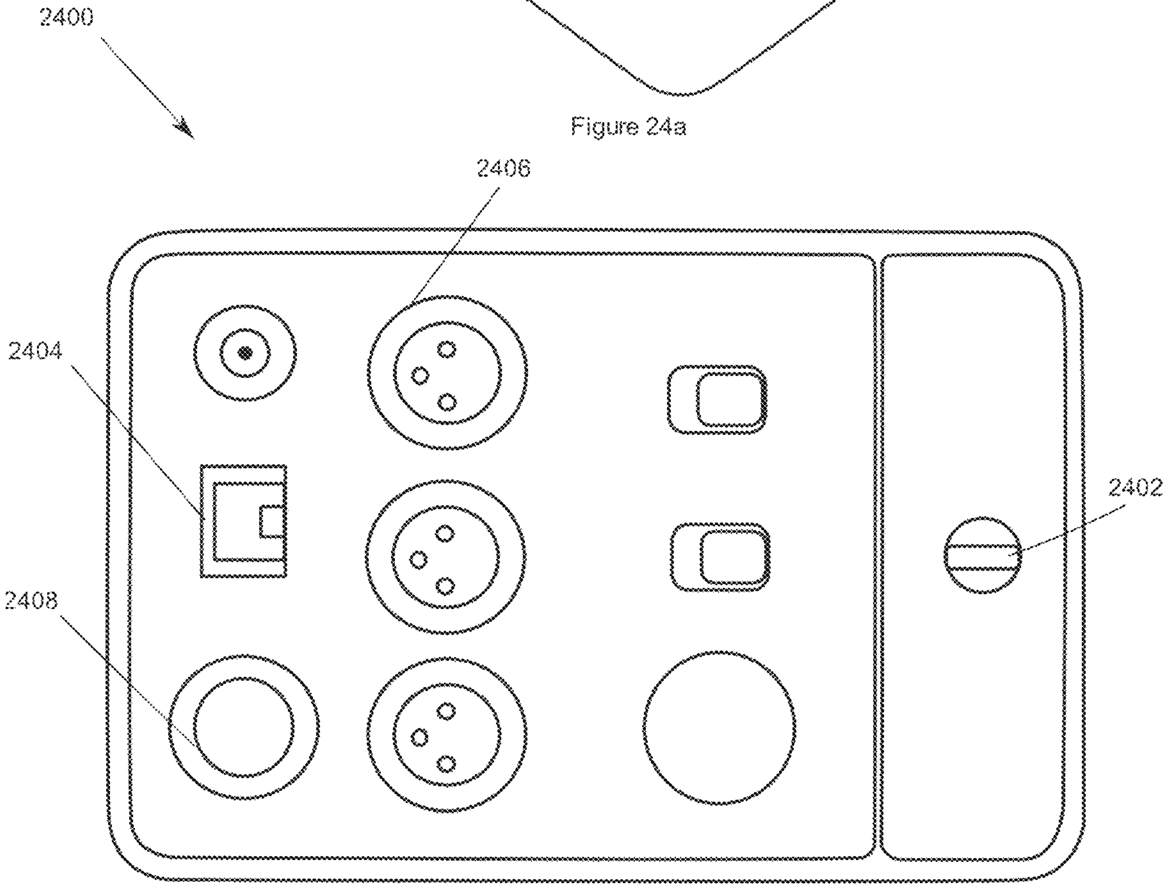
FIG. 24*b* is a plan view of the processor housing in FIG. 24.

The microphone housing may be connected to a separate control housing. The control housing can be used to allow a user to interface with the microphone or to allow the system to connect with additional external hardware such as other audio interfaces. Alternatively, the microphone housing may include all the necessary electronics inside. An example control housing 2400 is shown in FIGS. 24*a* and 24*b*.

The control housing 2400 may include internal circuitry including a processor and memory. The processor may for example include a FPGA System-on-module which may include complied code, which when executed may be used to beamform the microphone signals and apply the algorithm(s) described herein. The housing may include a multiway selector knob 2402 to select a desired beam width from a range of 3, 5 7 or 10 options, output signal attenuation, and/or high pass filtering. There may be a data connection 2404 such as a RJ45 or similar to connect to the microphone though a cable that allows power and data, such as power over ethernet. There may be differential analogue outputs 2406 using XLR jacks. The internal circuitry may be powered via batteries or via a DC adapter that can be plugged into a mains AC supply. It may include a ⅝" or ⅜" female mechanical mating port 2408 for industry standard mounting options, such as the motion picture industry's standards.

The multiway selector knob 2402 may allow the user to switch between beamwidths/selecting beams. This may be useful in a situation where multiple pickup patterns will be useful, such as in a film shoot where it may be desirable to capture the sound of the set as a whole in one take, and then a single isolated speaker in another.

The FPGA System-on-module may include an implementation of a beamformer using a bank of filters (each with variable beamformer coefficients/constants) that are applied to each signal channel in the microphone array before the outputs are summed. By changing these filters, the beamformer that is used can be changed which affects the beam pattern.

In the example where the filtering circuitry is included inside the microphone housing, the microphone can be configured to change the set of beamformer coefficients that are used based on an external signal. This signal may be sent from control housing. Alternatively, a laptop computer or smartphone may have a software interface that allows the user to select a desired beamformer to use and subsequently send a command signal to the microphone array, and receive the resulting beam pattern output.

The coefficients can be saved onto non-volatile memory and/or integrated into the code on the microphone array or in the FPGA System-on-module connected to the array. These coefficients may be reprogrammed to store a different set of beamformers on the device.

The array can be configured to record every individual microphone channel as a separate signal rather than performing beamforming in real time. When all the raw data is recorded, beamforming can be performed as post-processing. This can be done on the FPGA System-on-module, or the raw 80 (can be less or more for possible alternate designs) channel signals may be uploaded to a cloud processing server. Beamforming in post processing will allow the user to select from any number of beam patterns available so that a single full-channel raw recording can be processed into any number of directional focused signals. For example, a multi-channel recording of a room can be processed into signals containing only sound from certain directions inside the room in post, as opposed to beamforming in real-time where only the sound that the microphone array is pointing at (inside the beam) will be recorded.

Figure 25A:
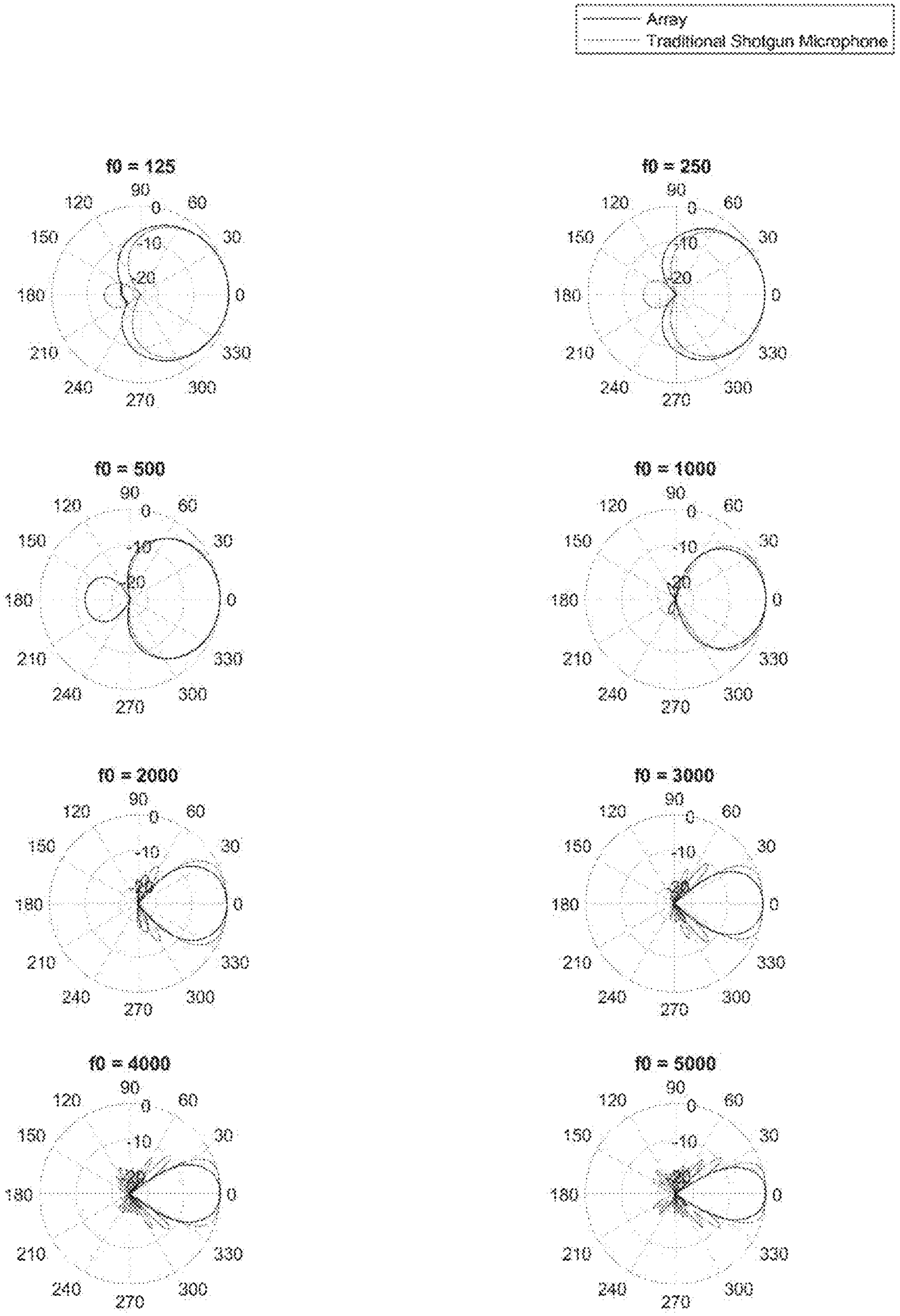
FIG. 25*a-b* are a series of polar plots comparing the beam pattern of an embodiment to that of a prior art condenser hyper cardioid shotgun microphone.
Figure 25B:
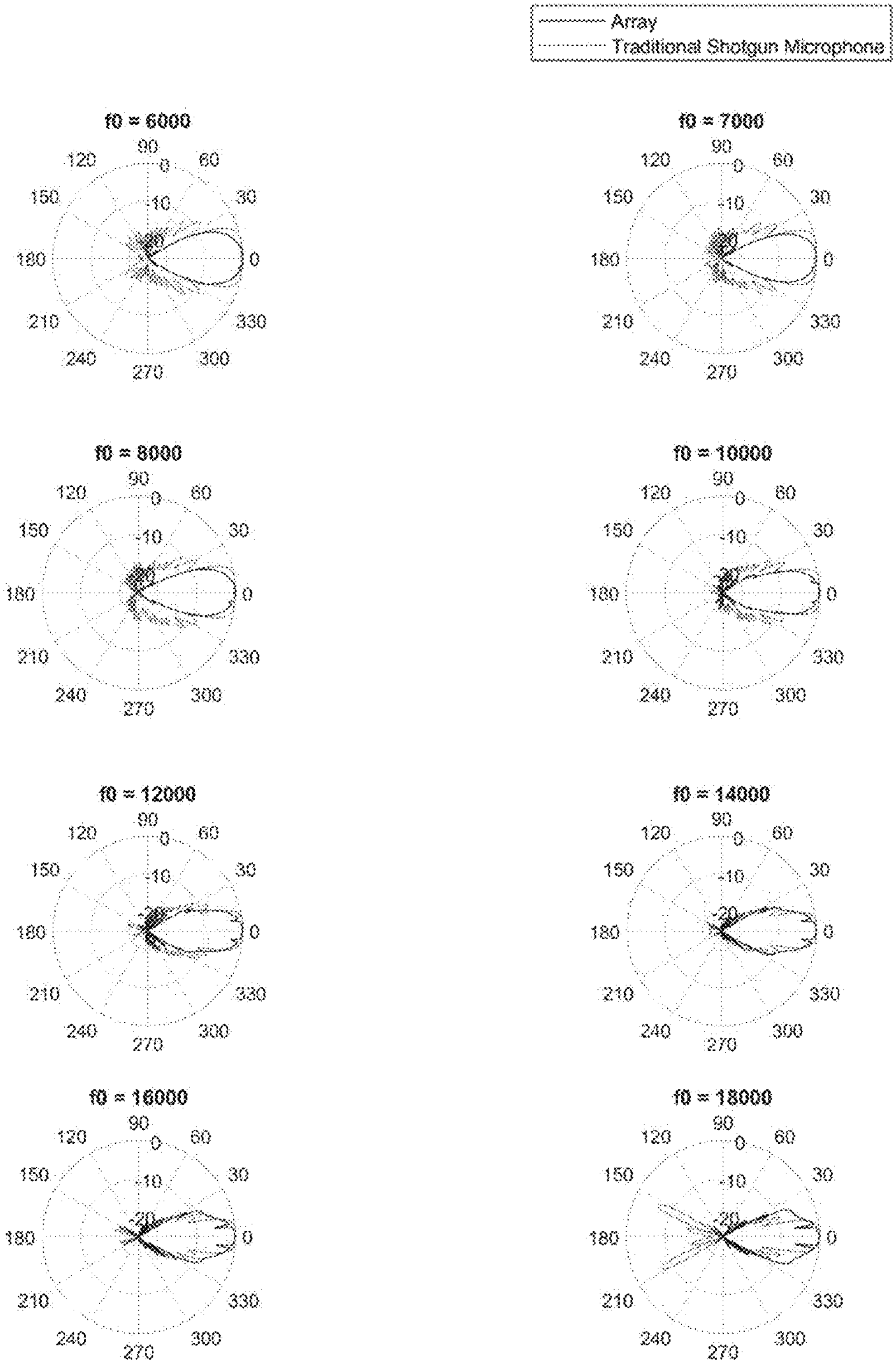

Using a microphone array such as FIG. 2 may minimise rear/side lobes across a wide range of frequencies compared to a traditional condenser hyper cardioid shotgun microphone (polar responses across different frequencies are as shown in FIGS. 25*a* and 25*b*). The plots of FIGS. 25*a* and 25*b* show that the peak sidelobe gain for the microphone array to be superior to the traditional shotgun microphone at many frequencies, being lower by 8 dB at 3000 Hz, at 5000 Hz, 12 dB at 10000 Hz, and 11 dB at 18000 Hz. The plots also clearly show that the number and width of the sidelobes is far smaller for the microphone array.

Any of the four larger, microphone bearing sides of the microphone array 200 may have a plurality of microphones linearly and uniformly spaced along the array axis. In the embodiment shown in FIG. 2, the plurality of microphones are substantially aligned so as to be parallel to the axis 204 and substantially centred with respect to either the height axis 212 (e.g. microphones on side 206) or width axis 214 (e.g. microphones on side 208). Alternatively, the microphones may be offset relative to one another in the height direction or in the width direction.

In some embodiments a linear, uniformly-spaced microphone array can have its frequency response improved if the spacings between the microphones differ. By way of background, the sampling theorem means spatial aliasing would occur if the spatial frequency exceeded half the sampling frequency, or equivalently, if the microphone spacings exceeded half a wavelength. In an embodiment where an end-fire beam is beamformed from the microphone array, this would mean that a (typically) undesirable aliasing lobe or aliasing lobes would be inadvertently generated at high frequencies, thereby affecting the desired end-fire response. The greater the spatial frequency exceeds the aliasing frequency, the more pronounced the aliasing lobes become. A skilled person would also be aware of, given a prescribed number of microphones, the trade-off between using larger spacings for a good aperture (yielding a long array), which would give better polar response at low frequencies, and using smaller spacings (yielding a short array), which would push aliasing lobes higher in frequency.

Non-uniformly-spaced arrays may advantageously produce a more constant beam pattern over a wider frequency range than a uniformly-spaced array. For example, an array with non-uniform spacings in the range 7.5 mm-10.0 mm would have better aliasing performance at high frequencies than an array with substantially uniform spacings of 10.0 mm but worse aliasing performance than an array with substantially uniform spacings of 7.5 mm.

In one embodiment, the microphone spacings are substantially uniform, and the spacing value is in the range of 2.5 mm to 30.0 mm In embodiments where the spacings are non-uniform, the microphone-bearing sides may all have the same non-uniform microphone spacing arrangement. Alternatively, at least one side of the microphone bearing sides may have non-uniform microphone spacings distinct from those of another side of the microphone bearing sides. In a non-uniform spacing arrangement, the inter-microphone spacings may increase or decrease from one end of the microphone array to the other end in a monotonic fashion. That is, starting from one end of the microphone array, the inter-microphone spacings either strictly increase or strictly decrease moving towards the other end of the microphone array. Alternatively, the variation in microphone spacing along the array may follow a periodic pattern (which can be monotonic or non-monotonic) or appear random (not following a periodic pattern).

In one embodiment, the microphone spacings are non-uniform and comprise 7, 8, 9.5, 12, and mm (approximately). In a further embodiment, the microphone spacings comprise these values and monotonically increase or decrease from one end of the microphone to the other.

The design of the microphone spacing may be optimised for a particular frequency band of interest or according to the requirements of the application.

An advantage a microphone array comprising a plurality of microphones, such as that shown in FIG. 2, has over a conventional shotgun microphone is that the microphone array may enable coherent averaging across all microphone elements in the array.

Figure 11:
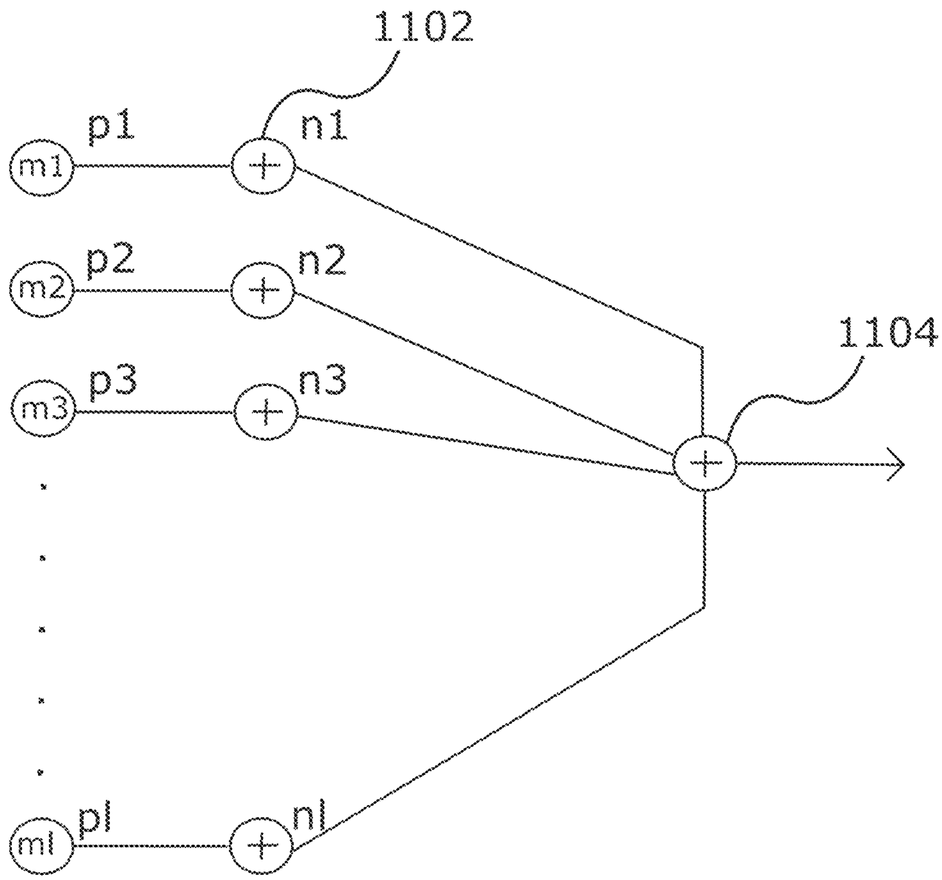
FIG. 11 is a schematic for a coherent averaging scheme for the microphone array according to one example embodiment.

In a practical system, electrical noise and noise-like signal variations due to minute air vibrations are inevitable and can be simplistically modelled as an additive signal at the output of each microphone. FIG. 11 depicts such a simple model for a microphone array with L microphones $m_1$ to $m_l$, l being an index between 1 and L. Noise signals $n_l$, l being an index between 1 and L, are introduced at the output of each one of the L microphones in the microphone array. Assuming substantially matched microphones and other circuitry, the noise signals $n_l$ will have substantially similar noise characteristics and will be generalisable to n.

Microphone output (pressure) signals $p_l$, l being an index between 1 and L, are summed with the noise signals $n_l$ at 1102. Assuming substantially matched microphones and effective phase compensation for each microphone, the signals $p_l$ will be substantially similar to one another and will be generalisable to p. The summer 1104 aggregates the signal powers and the noise powers.

The total root-sum-squares noise power can be approximated by $$\sqrt{\sum_{l=1}^{L}(n_l)^2} = \sqrt{L}\,\overline{n}, \tag{1}$$

where $\overline{n}$ is the noise power of one microphone, and the total microphone pressure signal power:

$$\sum_{l=1}^{L} p_l(t) = L\overline{p}, \tag{2}$$

where $\overline{p}$ is the pressure signal power of one microphone. This yields an approximation of the signal-to-noise ratio (SNR):

$$SNR = \frac{L\overline{p}}{\sqrt{L}\,\overline{n}} \tag{3}$$

Without coherent averaging across the L microphones in the microphone array, the SNR is approximately $\overline{p}/\overline{n}$. That is, a microphone array with L microphone elements may improve the SNR by an approximate factor of $\sqrt{L}$.

In embodiments where the microphone outputs are weighted by frequency-dependent filters, the real improvement in SNR may be less than $\sqrt{L}$ for higher frequencies as sets of microphones are virtually removed from the microphone array (L effectively decreases), as will be explained in more detail hereinafter.

A further benefit of using a microphone array, such as that shown in FIG. 2, is that having microphones disposed on four sides of the cuboid structure provides a more accurate approximation to a omnidirectional microphone, when the outputs of a set of microphones at a particular axial position are summed, than an embodiment where not every side of the four sides comprises microphones. This benefit is not limited to the embodiment of FIG. 2 and applies to embodiments where the microphone array assumes a structure other than the three-dimensional elongated cuboid, e.g. a triangular prism, a pentagonal prism, a hexagonal prism, or another polygonal three-dimensional structure suitable for a microphone array. The structure may be an n-sided polygonal prism, where n is an integer between (and including) 3 and 20.

At lower frequencies where the wavelength is substantially greater than the dimensions of the microphone array cross-section, a single microphone disposed on one side of the microphone array (as opposed to summing microphones from multiple sides of the microphone array) may be sufficient to approximate an omnidirectional response of the microphone array at that particular position along the array axis. At higher frequencies where the wavelength becomes comparable to dimensions of the cross-section, however, the geometry of the array cross-section, particularly the corners, manifests topographical obstructions and creates an acoustic shadowing effect such that a single microphone may not adequately approximate an omnidirectional response of the array. As a result, the beamformed output may not exhibit a substantially end-fire response due to it not being substantially omnidirectional about the array axis. Having microphones disposed on multiple faces of the microphone array, as is the case in the embodiment of FIG. 2, may mitigate this shadowing effect when the outputs of all the microphones at a particular axial position are summed together.

Figure 3:
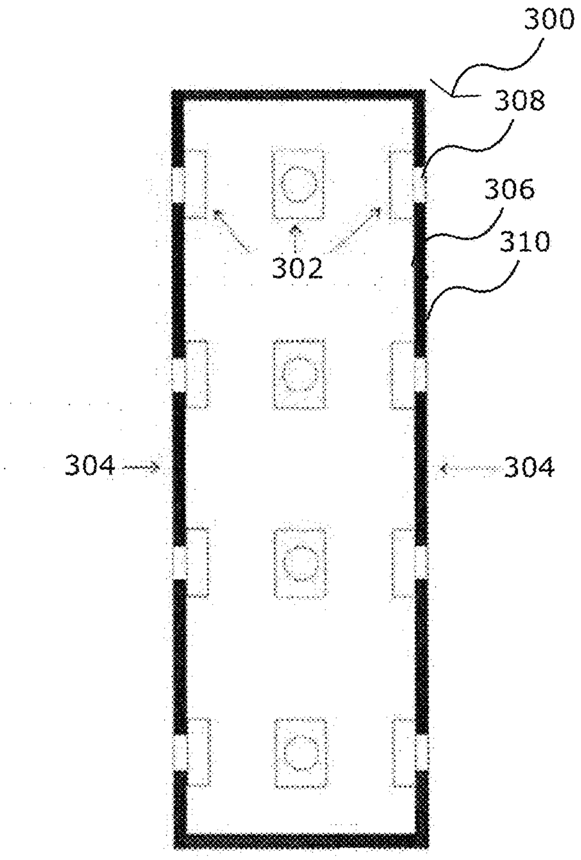
FIG. 3 is a top view of an example arrangement of surface-mount microphones and circuit boards within an example microphone array according to one embodiment.

FIG. 3 illustrates an example layout of microphones 302 on a microphone array 300 composed of PCBs 304. In this embodiment the microphones are mounted on the inward-facing surface 306 of the microphone array 300 and may be surface mount devices with the sound entering a microphone from the rear or underside (corresponding to the exterior 310 of the microphone array 300), for example via a hole 308 in the PCB 304 underneath the microphone 302. In this embodiment, disposing the microphones 302 on the interior 306 of the microphone array allows for an exterior surface 310 of each side of the microphone array that is substantially free of protruding components (such as electrical or acoustic components). Disposing the microphones 302 on the interior of the microphone array 300 may shield the microphones 302 against such damages as abrasion, spillage, or impact from small projectiles. However, some or all of the microphones 302 on any side or sides of microphone-bearing sides may also be externally mounted on the exterior 310 as required. In the embodiment of FIG. 3, each of the microphone-bearing sides comprises four microphones, but in different embodiments they may each comprise any number of microphones, insofar as practically feasible.

Figure 4:
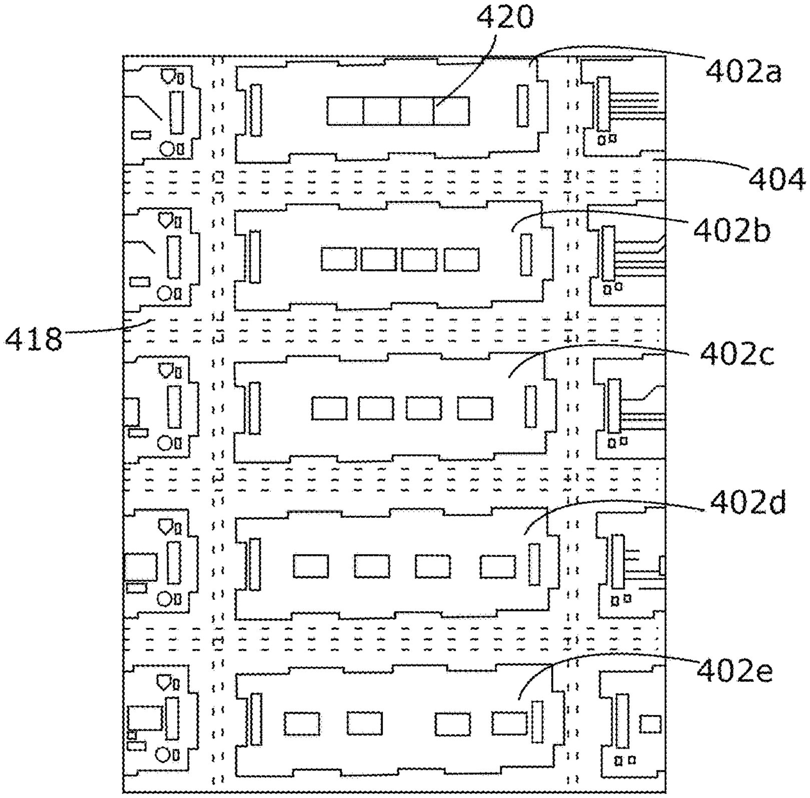
FIG. 4 is a top view of an example of a printed circuit board containing multiple microphone array circuit boards.

FIG. 4 illustrates an example embodiment of the microphone-bearing circuit boards that form a microphone array. The circuit boards forming the microphone array may be fabricated or produced in a collection or array of multiple circuit boards 402*a*-402*e* on one larger printed circuit board 404. The microphone-earing circuit boards 402*a*-402*e* may be designed so that they secure or lock together along each edge and mate with two end boards (not shown) so that, once the array is assembled, for example by soldering and/or sealing with adhesive, it may be substantially airtight around the edges.

Assemblage tabs and slots 418 may be arranged as cut lines for removal of the circuit boards 402*a*-402*e* from the larger printed circuit board 404. The assemblage tabs and slots 418 are arranged to facilitate a substantially airtight or otherwise secure seal when circuit boards are combined.

The above-mentioned variation of microphone 420 spacing is also illustrated in the embodiment of FIG. 4, where it is shown that the spacings of the microphones on the circuit boards near the top of the larger printed circuit board 404 are smaller than the spacings near the bottom. In this non-limiting example, the spacings are shown to increase from top to bottom, with 402*a* having the smallest spacings and 402*e* having the largest spacings.

Each of the microphone-bearing circuit boards 402*a*-402*e* comprises four microphones 420, but in different embodiments they may each comprise any number of microphones, insofar as practically feasible.

Figure 5:
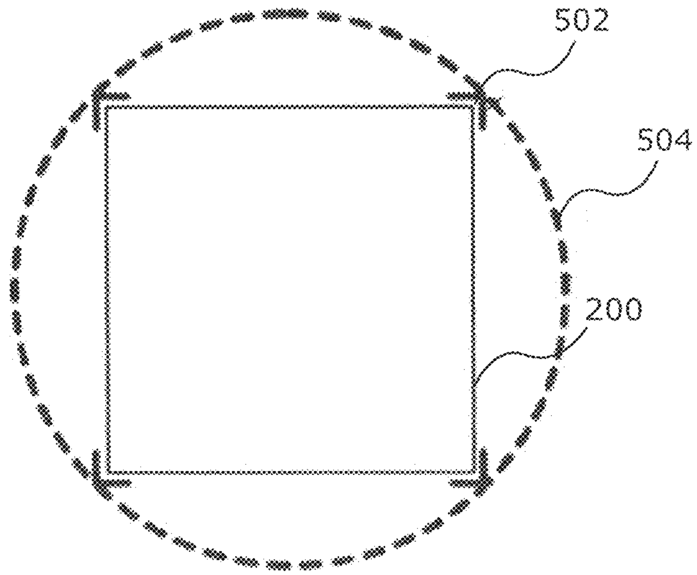
FIG. 5 is a cross-sectional view of an embodiment having an external support frame and shielding that covers the microphone array for additional protection and structural integrity.

The three-dimensional microphone array embodiments described herein are structurally rigid due to the inherent rigidity of the circuit boards that make up the array. The microphone array 200, however, can be further protected by sliding or otherwise disposing the microphone array 200 into a rigid external frame 502, according the cross section shown in FIG. 5. This frame 502 may consist of a solid metal shell with holes that align closely with the microphones and the circuit board holes. In an alternative embodiment, the external frame may consist of four corner rails, each connected to each other, with the rails being covered by a cylindrical, acoustically transparent shielding 504 that provides further protection and rigidity.

The microphones of the microphone array may use any suitable type of microphone technology, such as MEMS (microelectromechanical systems) microphones, condenser microphones (for example, electret condenser microphones), electret microphones, parabolic microphones, dynamic microphones, ribbon microphones, carbon microphones, piezoelectric microphones, fiber optic microphones, laser microphones, noise camera and/or liquid microphones. A microphone may be used because of its particular receiving characteristics, for example, a hyper-cardioid shotgun microphone, a three-cardioid microphone and/or an omni-directional microphone. In embodiments where the microphone array is composed of a plurality of PCBS, MEMS microphones may be preferable to other microphone technologies, for existing PCB manufacturing processes allow cost-efficient and compact integration and/or interconnection of the microphones with other circuitry on the PCB.

The microphone may be selected to take advantage of its particular properties. Such properties may include directionality (as shown by its characteristic polar pattern), frequency response (which may correspond to the target audio and/or noise), or signal to noise ratio.

Further, MEMS microphones are produced using silicon fabrication and hence typically well-matched, so that they have very similar on-axis and polar responses (for example to within 1 dB). This property may be particularly desirable for a beamformed microphone array, as it allows the design and implementation of the beamformer to be simplified, by assuming all microphones in the array are identical.

The microphones of the microphone array may additionally incorporate an analogue-to-digital converter so that the output of the microphones is a digital bitstream.

Beamformer

End-Fire Response (Beam Steering)

A microphone array described above is a three-dimensional elongated cuboid structure, with microphones linearly disposed on four of the six sides of the cuboid along the axis of the array. This arrangement is, in its most general usage, capable of producing general 3D polar responses, wherein the output of each microphone may be fed to a separate digital filter implemented on a suitable processing unit, which applies a particular phase and magnitude weight at each frequency.

An end-fire sensor array may be defined as a device with multiple sensors aligned in a straight line such that one sensor is immediately in front of another, and where the beamforming performed on the incoming signals focuses the main directivity of the beam to one end of the line. However, the definition of end-fire will depend on the particular application.

The array may not be a single line array but can be a 3D structure composed of multiple parallel line arrays. However, the beamforming performed is still directed to one end of the 'line' and the characteristics of the structure remain close to that of a single end-fire line array.

Due to the 3D structure of the array configuration, it is also possible to use the array in a broadside beamformer configuration, where the directivity of the beamformer is pointed perpendicular to the orientation of the microphone array. Other more complex beam patterns are also possible.

The beamformers used with the array are rotationally symmetrical about the centroid line parallel to each of the microphone lines on each PCB surface of the array device. An end-fire beam thus has a directivity that looks like a 3D 'cone' extending from one end of the array, or may otherwise be described as a conical beam pattern.

Figure 6:
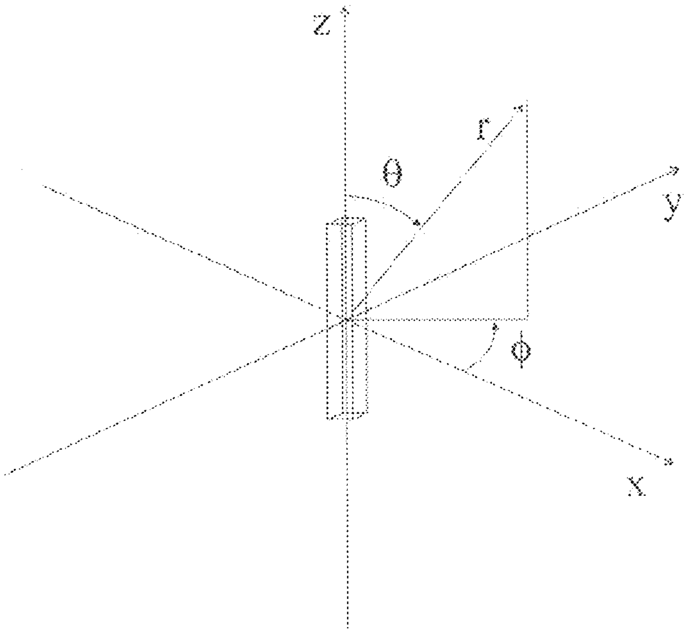
FIG. 6 shows an example spherical coordinate system used to describe the polar response of a microphone array according to one example embodiment.

FIG. 6 shows an example microphone array positioned vertically, so that the axis of the array is the vertical z axis. This orientation is for exemplary purposes, for ease of explanation and analysis. The microphone array, in use, can be configured in any orientation depending on the application. The directivity of the array can then be described in spherical coordinates in terms of the polar angle, $\theta$, measured from the z axis, and the azimuth angle, $\phi$, measured from the x axis as shown.

The microphone array can be operated in at least two simplified modes of operation.

One simplified use of the array is produced if all microphones down one side of the array have the same weighting. In this case, the array can produce a first-order response in azimuth, $\phi$. The response of the array in elevation (z) would then be a first-order or second-order beam in the horizontal plane. This configuration could have application in teleconferencing systems, where the microphone array is oriented so that its axis points towards the ceiling. Using equal weightings for each microphone with height, the polar response in elevation would become increasingly narrow with frequency.

A second simplified use of the array occurs if all four microphones (one on each side) at one elevation in z have the same weightings. In this case, the outputs of all four microphones at the same position along the array axis may be added together and fed to a single digital filter. For a microphone with L microphones, this case would require only L/4 digital filters per beamformer output. In the embodiment disclosed in FIG. 2, the microphone array comprises in total 80 microphones. Sets of four microphones are added to produce 20 outputs, and 20 digital filters may be used to produce two beamformer outputs.

This mode of operation is well-suited to the creation of improved end-fire "shotgun" responses which have rotational symmetry about the array axis, and other rotationally symmetric responses, since adding the four microphones on each side will produce an output which is omnidirectional with azimuth up to a high frequency. The following analysis relates to this end-fire approach and assumes that the array is substantially equivalent to a set of omnidirectional microphones in free space at a set of positions along the z-axis. In practice, it has been identified that this idealisation is closely approximated by the second simplified mode of operation.

Diffraction around the cuboid structure can alter the exact invariance in azimuth. This effect will be ignored in the following analysis for simplicity.

The ideal end-fire array performance is obtained by assuming an infinite density of microphones over a total array length D. An incident plane wave arriving from angle of arrival (θ, ϕ), at radian frequency ω, produces a sound pressure on the z axis which is independent of ϕ and which has the form $$p_i(r,\theta,\phi)=e^{ikz\cos\theta} \quad (4)$$

Where $$k=\frac{\omega}{c}$$

is the wave number and where c is the speed of sound. The response of the continuous array has the normalised form $$b(k,\theta)=\frac{1}{D}\int_{-D/2}^{D/2} w(z)e^{ikz\cos\theta}dz \quad (5)$$

where w(z) is the array weighting function. The simplest form of weighting is to apply a delay such that all array positions produce signals that are in phase for an on-axis plane wave. For this case $$w(z)=e^{-ikz} \quad (6)$$

The resulting polar response is $$b(k,\theta_i)=\frac{1}{D}\int_{-D/2}^{D/2} e^{ikz[\cos\theta-1]}dz=\frac{\sin\left[\frac{kD}{2}(1-\cos\theta)\right]}{\frac{kD}{2}(1-\cos\theta)} \quad (7)$$

This is a sinc function response with a peak at θ=0 (cos θ=1). A measure of the beamwidth of the response can be found as the angle where $$b(k,\theta)=\frac{1}{2}.$$

This occurs where $$\frac{kD}{2}(1-\cos\theta)=1.895 \quad (8)$$

This produces the angle (which is a function of wavenumber k and dimension D)

$$\theta_B=\cos^{-1}\left[1-\frac{3.79}{kD}\right] \quad (9)$$

At small kD the argument in (9) is less than −1, the response never falls below one half and $\theta_b$ may be set equal to 180 degrees, signifying that the array response is largely omnidirectional.

Figure 7:
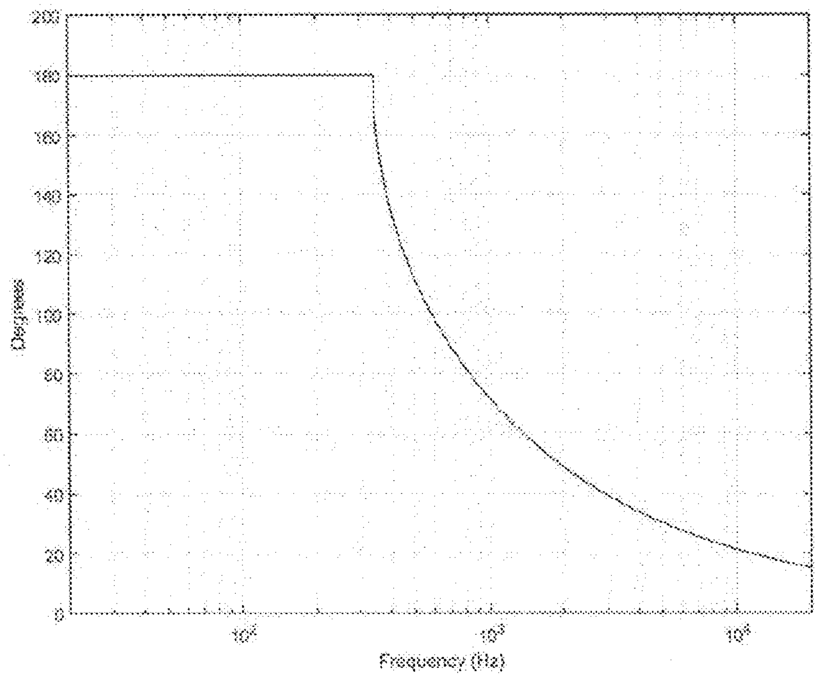
FIG. 7 shows the beamwidth variation as a function of frequency for an example microphone array with uniformly distributed microphones.

FIG. 7 shows the beamwidth of an ideal end fire array with a 300 mm aperture. The array is approximately omnidirectional up to 300 Hz (which is approximately where D is a quarter wavelength) and the beamwidth reduces with frequency to around 20 degrees at 10 kHz. This highlights the limitations of the finite length array with simple delay weighting: it has poor directionality at low frequencies and the beamwidth varies with frequency. For this reason, interference tube shotgun microphones may use a directional capsule to provide some directivity at low frequencies and may alter some of the inlet slots to make them frequency dependent.

A method is now described for designing a beamformer assuming a discrete line array of omnidirectional microphones positioned on the z axis, producing beam patterns that are constant in azimuth. The microphone positions may be denoted by $z_l$, with l ranging from 1 to L, where L is the total number of microphones in the microphone array. The microphone spacings may be uniform or non-uniform. In cases where the microphone spacings are non-uniform, the net effect may be such that a variety of spacings are produced, which is required to prevent significant aliasing occurring at high frequencies, while maintaining sufficient aperture at low frequencies. As an example embodiment, the generation of an end-fire beam and an end-fire null is considered.

The incident wave is given by (4). If each microphone output is multiplied by a weight $w_l$, which is complex in the general case, then with the weighted outputs added, a beam beamformed from the microphone array is $$\tilde{b}(k,\theta)=\sum_{l=0}^{L-1} w_l e^{ikz_l\cos\theta} \quad (10)$$

where b(k, θ) is the polar response at wavenumber k. This can be seen to be a discrete approximation to (5). If the weights are simple delays of the form (6)

$$w_l=e^{-ikz_l} \quad (11)$$

then the resultant polar response will approximate the end-fire response in (7). The corresponding response will be referred to as the delay-only solution hereinafter, and the corresponding beamformed microphone array the phased array.

A significant practical limitation in using a discrete set of microphones with equal microphone spacings is that the polar response significantly deviates from the ideal expression (7) for frequencies above the spatial aliasing frequency, where the spacing between the microphones is a half wavelength. The spatial aliasing frequency for a fixed spacing d is $$f_{alias}=\frac{c}{2d} \quad (12)$$

For example, for a microphone spacing of d=15 mm, and an air temperature of 20 degrees Celsius, the aliasing frequency is 11.4 kHz.

If the microphone spacings are non-uniform, the aliasing frequency is then predominantly given by the minimum microphone spacing $$f_{alias}=\frac{c}{2\min\{d_m\}} \quad (13)$$

For example, with the spacings given above the minimum spacing is 7 mm, producing an aliasing frequency of 24.5 kHz. Since not all microphones are placed this closely, there may be some increase in sidelobes below this frequency. However, these sidelobes do not have the large amplitudes they would have in the uniformly spaced case.

Directivity Control

A mere phased array is capable of beam steering but has no control over directivity as the frequency of the audio varies. Physically, the effect frequency variation has on beam directivity can be mitigated by shortening the length of the microphone array in response to an increase in the audio frequency. It will be appreciated, however, that physically removing microphone elements from the microphone array is slow and may prove infeasible in most audio capture applications.

A substantially equivalent effect can be realised by generalising the delay-only weights in (6) to scale the magnitude, as well as change the phase, of the microphone output. Additionally, the magnitude scaling must also be frequency dependent. For example, the weight for a microphone may incorporate a low-pass filter with a cut-off frequency $f_c$, so that the output of said microphone is substantially attenuated for components of an audio signal with a frequency higher than $f_c$.

The outputs of all the microphones at the same position along the array axis may undergo the same low-pass filtering by virtue of them having identical weights. In this way, it would be as if said microphones were removed from the microphone array in the event that any frequency variations exceeded the cut-off frequency $f_c$. This method of virtually shortening the length of the microphone array may be preferable to physically removing microphones from the microphone array.

Figure 8:
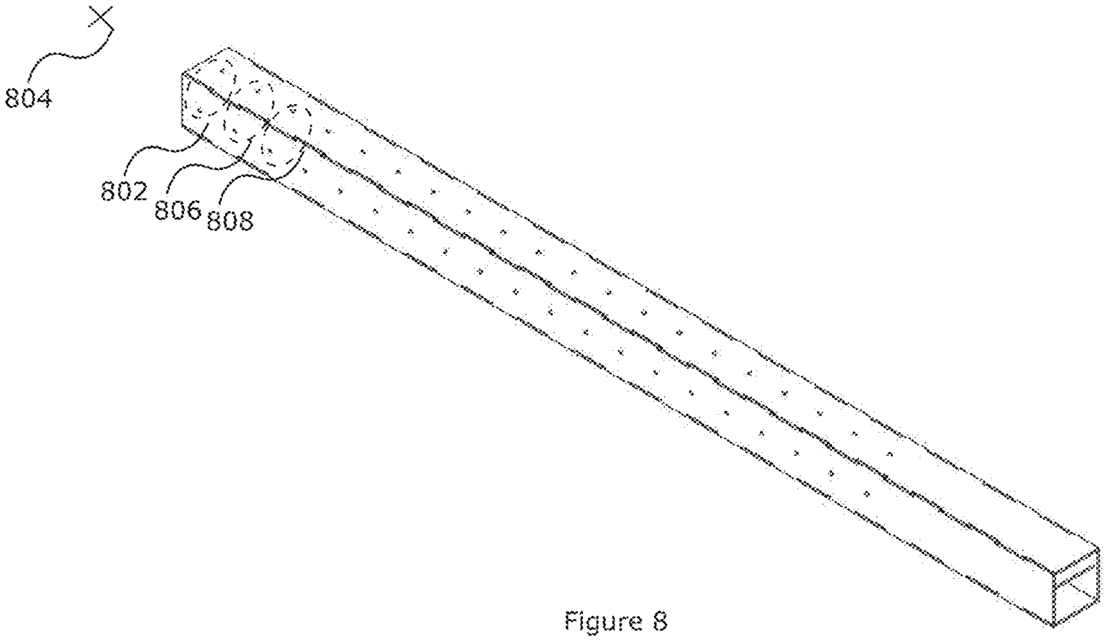
FIG. 8 shows an example microphone array with virtually adjustable array length for directivity control across different frequencies in a single-ended configuration.

Outputs of microphones at other positions along the array axis may have similar low-pass filtering applied to them, except with different cut-off frequencies. In one embodiment, the cut-off frequencies may progressively increase for microphones that are further away from an end of the microphone array. This can be regarded as a single-ended configuration. FIG. 8 depicts an embodiment having such a single-ended configuration, wherein the set of microphones 802 (only two microphones are visible) having the same axial position and being closet to the end proximate to a target audio source 804, have low-pass filtering with cut-off frequency $f_{c1}$ applied to their outputs. The set of microphones 806, being adjacent to the set of microphones 802 and next-closest to the end proximate to the target audio source 804, have low-pass filtering with cut-off frequency $f_{c2}$ applied to their outputs, where $f_{c2}$ is higher than $f_{c1}$. This filtering arrangement extends along the microphone array such that $f_{c3}$ corresponding to the set of microphones 808 is higher than $f_{c2}$, and so on. The effect of such an arrangement is that, as frequency increases, sets of microphones are virtually removed from the microphone array in a sequential manner along the axis of the array.

Figure 20:
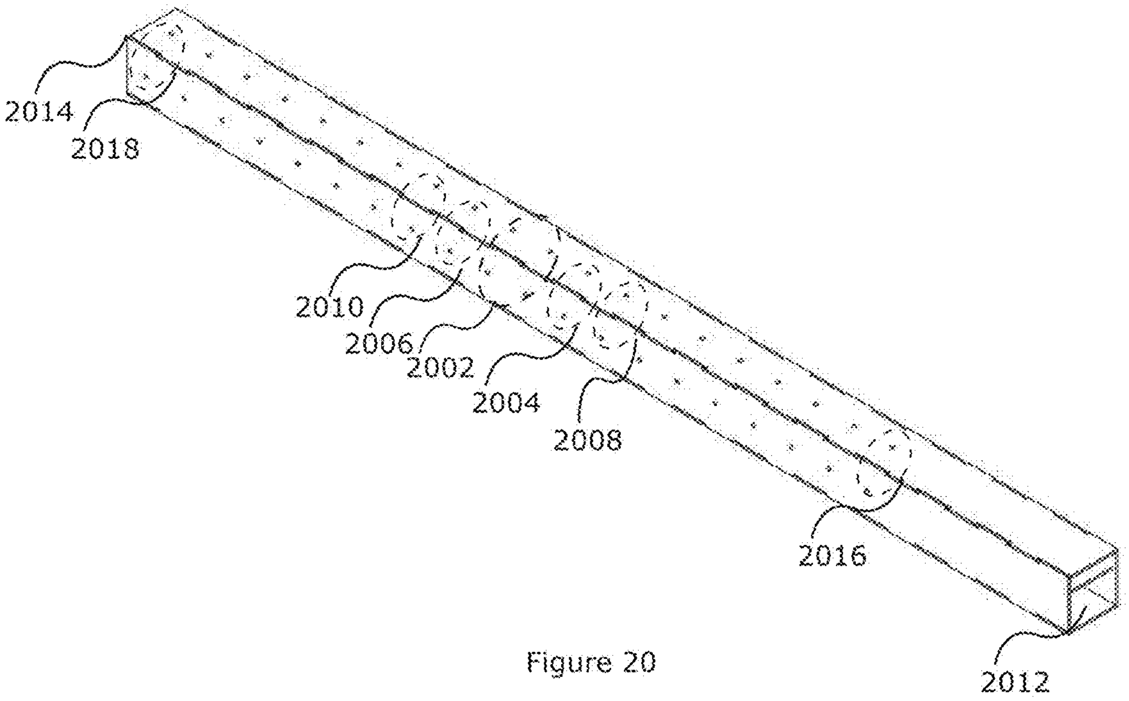
FIG. 20 shows an example microphone array with virtually adjustable array length for directivity control across different frequencies in a double-ended configuration.

Alternatively, a double-ended configuration may be implemented as shown in FIG. 20. In such a double-ended configuration, the cut-off frequencies progressively decrease with distance from the central microphones 2002, which have the broadest bandwidth. The sets of microphones 2004 and 2006 having the same axial separation from and being closest to the central microphones 2002 have low-pass filtering with cut-off frequency $f_{c1}'$ applied to their outputs. The sets of microphones 2008 and 2010, being next-closest to the central microphones 2002, have low-pass filtering with cut-off frequency $f_{c2}'$ lower than $f_{c1}'$. This progressive decrease in cut-off frequency extends along the microphone array symmetrically about the central microphones 2002 towards the ends 2012 and 2014 of the microphone array, such that the sets of microphones 2016 and 2018 have the lowest cut-off frequency, being the sets furthest away from the central microphones 2002. This double-ended configuration may be preferable because it is in a sense more flexible than a single-ended configuration, as it is independent of whether a target audio source is near the end 2012 or the end 2014.

The difference between the two cut-off frequencies corresponding to any two adjacent sets of microphones may be substantially similar to that of any other two sets of microphones in the microphone array. That is, the cut-off frequencies for the low-pass filtering may increase substantially linearly from one end of the microphone array to the other in the case of a single-ended configuration. In a double-ended configuration, the cut-off frequencies for the low-pass filtering may decreases substantially linearly with distance from the central microphones.

General Solution

To produce a more general solution than the delay-only solution or the delays and low-pass filter solution, we require the resulting polar response (10) to equal a desired response b(k, θ). Equation (10) can be written, at a given frequency, for a set of N angles $\theta_n$ in matrix notation as $$Pw=b \tag{14}$$

where the matrix P is N by L with entries $$P(n,l)=e^{ikz_l\cos\theta_n} \tag{15}$$

and where w is an L by 1 vector of microphone weightings $w_l$.

The desired end-fire polar response including a specification of the desired beamwidth is stored as a N by 1 vector, denoted b. The optimum weights, in the least squares sense, can be determined by minimising the squared error $$\varepsilon^H\varepsilon=[b-Pw]^H[b-Pw]=b^Hb-b^HPw-w^Hp^Hb+w^Hp^HPw \tag{16}$$

where superscript H denotes the conjugate transpose. A least squares solution for w can be obtained $$w=[P^HP]^{-1}P^Hb \tag{17}$$

The risk of using (17) is that the solution weights may have large magnitudes. This means that any small variations between the microphone responses, or in their positioning, would lead to large variations in the resulting polar response. In other words, the solution is not robust.

To improve the robustness of the solution, (17) can be modified by requiring that the total weight energy w H w also be controlled. In addition, it is useful to be able to control how much error occurs at each angle. These two goals are achieved by first defining the weighted error $$\varepsilon_w=G\varepsilon=G[b-Pw] \tag{18}$$

where G is a diagonal matrix obtained from an N by 1 error-weighting vector g, with elements $$G=\begin{bmatrix} g_1 & & & \\ & g_2 & & \\ & & \ddots & \\ & & & g_N \end{bmatrix} \tag{19}$$

and then minimising $$\varepsilon_w^H \varepsilon + \lambda w^H w = [b - Pw]^H G^H G[b - Pw] + \lambda w^H w \quad (20)$$

where $\lambda$ is a Lagrange multiplier. Defining a matrix $R=G^H G$ the weighted error is $$\varepsilon_w^H \varepsilon_w = b^H Rb - b^H RPw - w^H P^H Rb + w^H P^H RPw + \lambda w^H w \quad (21)$$

The optimum weights are obtained by computing a regularised least squares solution, yielding $$w=[P^H RP+\lambda I]^{-1} P^H Rb \quad (22)$$

This solution can be calculated at a set of equi-spaced frequencies and an inverse discrete Fourier transform used to produce a set of filter impulse responses that allow the beamformer to be implemented in a digital processor. Alternatively, the weights may be determined in the time domain using convolution matrices and a weighted, regularised least squares solution. In order to produce the least squares solution (21), a desired beam shape vector, b, and error weighting vector, g, must be specified.

An end-fire beam beamformed using weights obtained according to this method may exhibit directivity more constant with frequency than an end-fire beam beamformed using delay-only weights. Additionally, an end-fire beam beamformed using weights obtained according to this method may exhibit a more constant gain across the beamwidth than an end-fire beam beamformed using delay-only weights.

Figure 19:
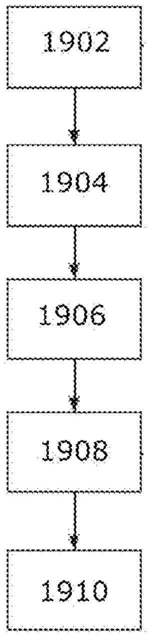
FIG. 19 is a flow diagram for effecting beamwidth variation according to an example embodiment.

In this way, the beamwidth of an existing beam may be varied, as depicted by FIG. 19. At step 1902, a new desired beam response b(k, θ) and an optional error weight vector g are stored; the new desired response has a different beamwidth compared to the existing beam. At step 1904, an error vector E is determined (e.g via computation) from the new desired response b and the current beamformer output. At optional step 1906, regularisation is achieved using the weighting vector and the error vector. At step 1908, optimal new weights can be computed as a least squares solution or a regularised least squares solution. At step 1910, a new beam is beamformed using the weights computed at step 1908. The new beam will more closely approximate the desired response. Specifically, the new beam will have approximately the desired beamwidth, which will be distinct from the beamwidth of the existing beam. Quantitatively, this may mean that a suitable norm of an update error vector is smaller the same norm computed from the previous error vector.

For non-cylindrical three-dimensional array structures, the method of obtaining weights for the microphone outputs outlined above can be made more robust by factoring in the diffraction characteristics associated with a particular array structure geometry e.g. a three-dimensional elongated cuboid structure. The diffraction behaviour may be modelled using a numerical acoustic package such as BEM or FEM to characterise the effect the array structure geometry has on the microphone response. The beamformer may then be made more robust by including a diffraction compensation factor in the beamforming processing, and the resultant beam rendered a closer approximation to the desired beam shape b.

Figure 9:
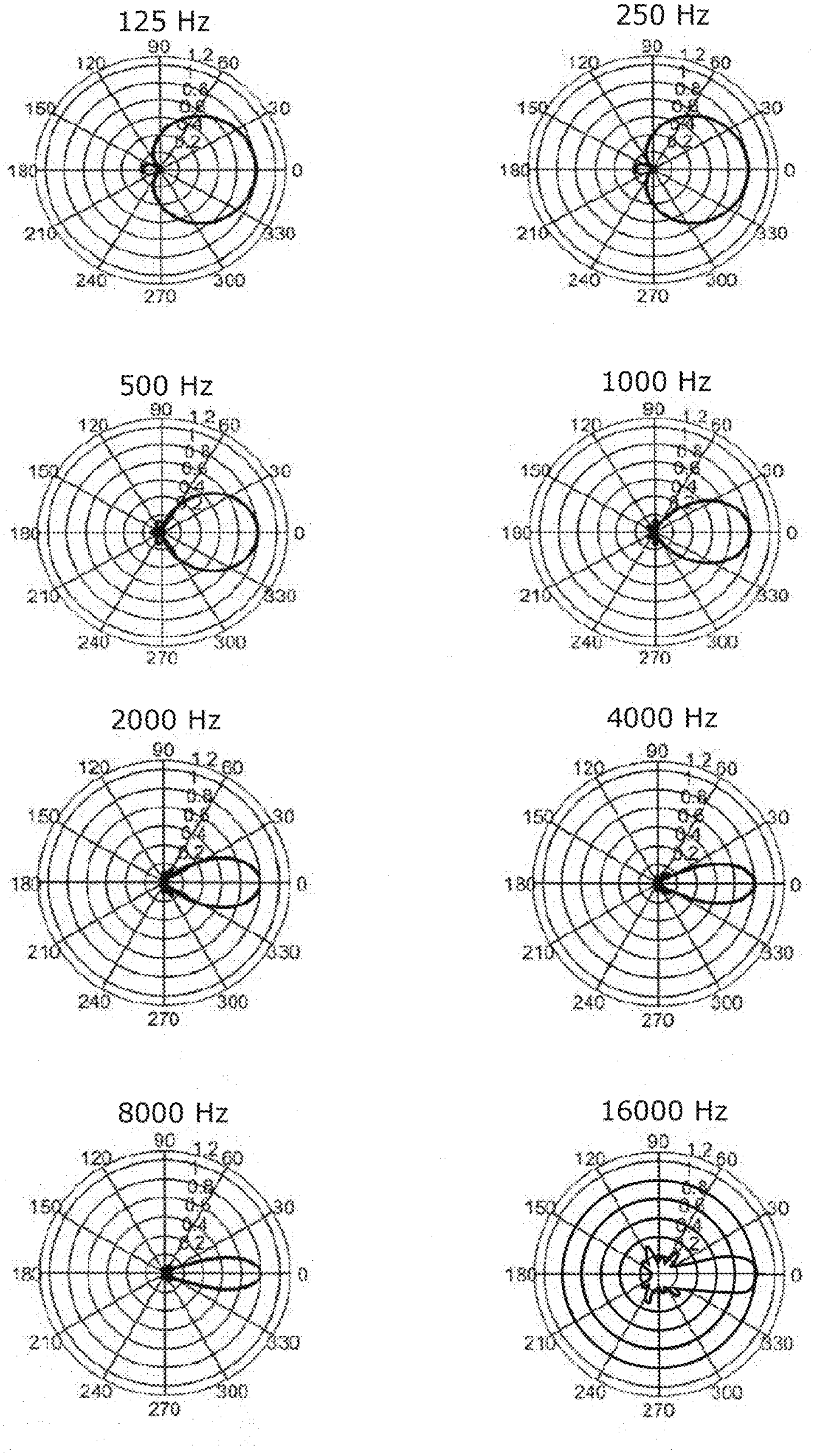
FIG. 9 is a polar plot of an end-fire main beam beamformed from a microphone array according to one embodiment.

FIG. 9 shows that the beamwidth of the end-fire beam is wide at low frequencies and reduces with increasing frequency. Ideally, the beamwidth is sharper at low frequencies, and is more constant with frequency. Although this method of obtaining weights does not involve designing low-pass filters for the microphone outputs, it may still give the effect of either the single-ended configuration or the double-ended configuration discussed in the preceding directivity control section. That is, the outputs of certain microphones may become attenuated at high frequencies due to low-pass filtering effected by the optimum beamforming weights.

However, the least squares solution cannot overcome the fact that the array is small compared to the wavelength at low frequencies. Hence, some compromise in the desired beam shape must be accepted. The beamwidth in (9) is the natural limit for the array, and will be used as a reference for a feasible beamwidth, but will be modified so that it varies between a maximum width $\theta_{B\ max}$ (at low frequencies) and a minimum width $\theta_{B\ min}$ (at high frequencies). In other words, the array is required to perform better than the delay-only solution, without being unreasonable.

FIG. 9 show an example set of end-fire polar responses produced using (21) for an end-fire main beam response. The polar responses are similar to a first order response at low frequencies but become more directional above 300 Hz as expected. The beamwidth does not become excessively narrow at high frequencies. At 16 kHz there is an increase in sidelobes, but these remain small compared to the main beam response. The effect of the directivity control is such that there is a less than 50% variation in the beamwidth of the main lobe across the frequency range of 2000 Hz to 16000 Hz.

Figure 10:
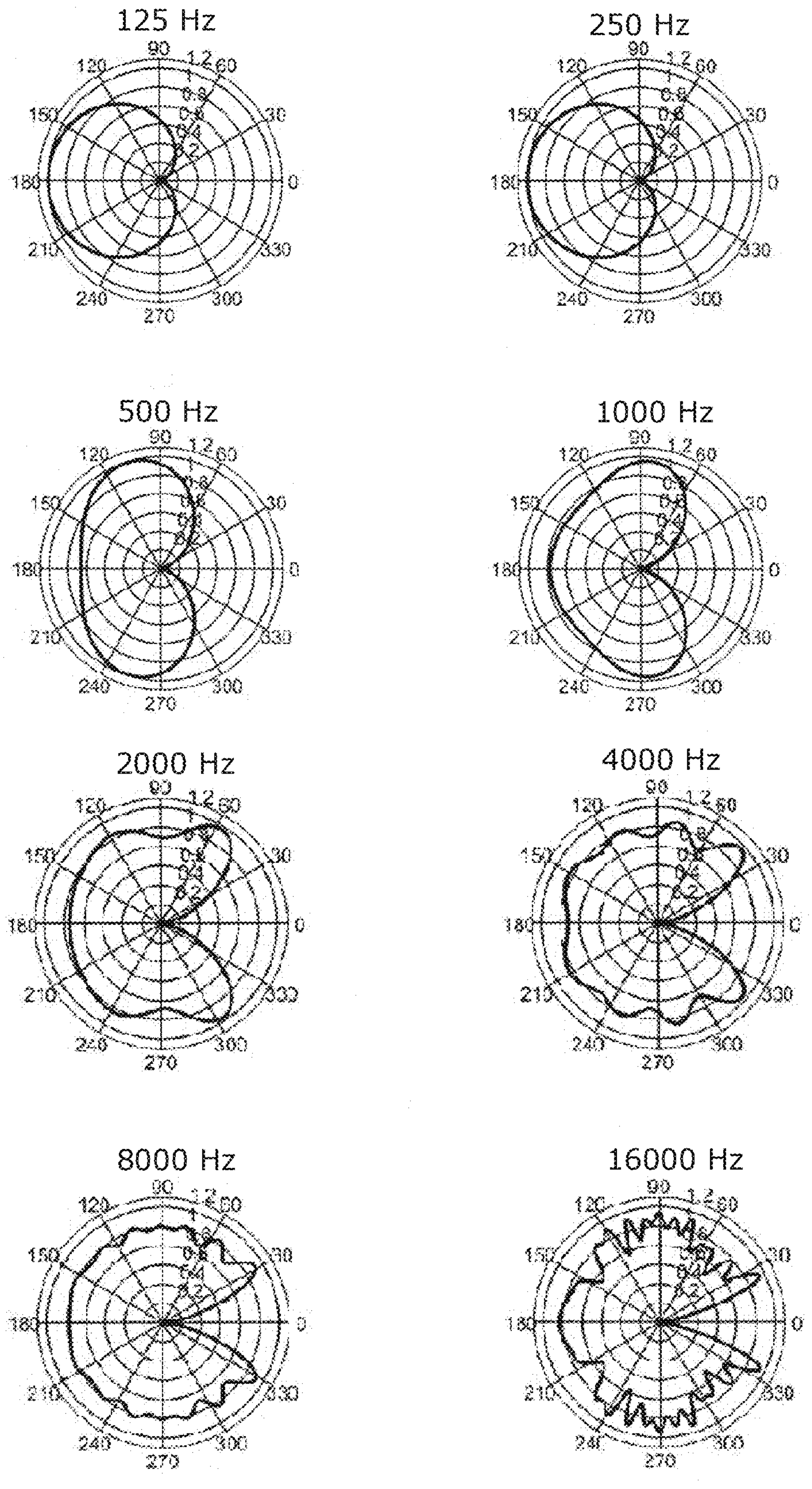
FIG. 10 is a polar plot of an end-fire null beam beamformed from a microphone array according to one embodiment.

FIG. 10 shows an example set of end-fire null responses. The response is also similar to a first order response with a forward-facing null at low frequencies, but gradually becomes a null beam which is the complement of the main beam at high frequencies. The 16 kHz response shows an increased variation in response, but it remains approximately omnidirectional with a null at zero degrees.

Since the speed of sound varies with temperature, the required delays will vary with temperature. This will alter the response produced by the array slightly at high frequencies, where the resulting changes in propagation speeds along the array produce phase shifts which are not properly compensated for by the beamformer. In practice these variations are relatively small for moderate temperature changes but can be taken into account by designing beamformers for multiple sets of temperatures if required.

Applications

Noise Filtering Algorithm

The provision of a main beam and a null beam through beamforming on a microphone array may be used as a part of an overarching noise-filtering algorithm. According to one example embodiment, the noise-filtering algorithm receives audio recorded from one or more target audio sources and noise from noise sources comprising general ambient noise and/or one or more specific noise sources and, after some processing (including beamforming), outputs 'clean' filtered audio which substantially preserves the target audio but substantially removes noise.

The microphone array may be the sole sound capturing device, in which case it indiscriminately records audio from the target audio source and from the noise sources. This aggregation of audio from multiple sources may be referred to as the raw audio. Beamforming spatially filters the raw audio, giving two outputs including an end-fire main beam and an end-fire null beam as described hereinbefore, and the results are depicted in the polar plot of FIG. 12. As shown, the end-fire main beam 1202 beamformed from the microphone array 200 is pointed at a target audio source 1204, allowing target audio to be captured with high sensitivity relative to the suppressed sensitivity in the directions of the noise sources 1206. Conversely, the shape of the end-fire null beam 1208 means that the noise audio will be captured with high sensitivity, while the target audio suppressed. It may be preferable to generate an end-fire null beam 1208 that is substantially wider than the end-fire main beam 1202. In the ideal case, the polar response of the null beam 1208 is the complement of that of the main beam 1202 at all frequencies.

Figure 12:
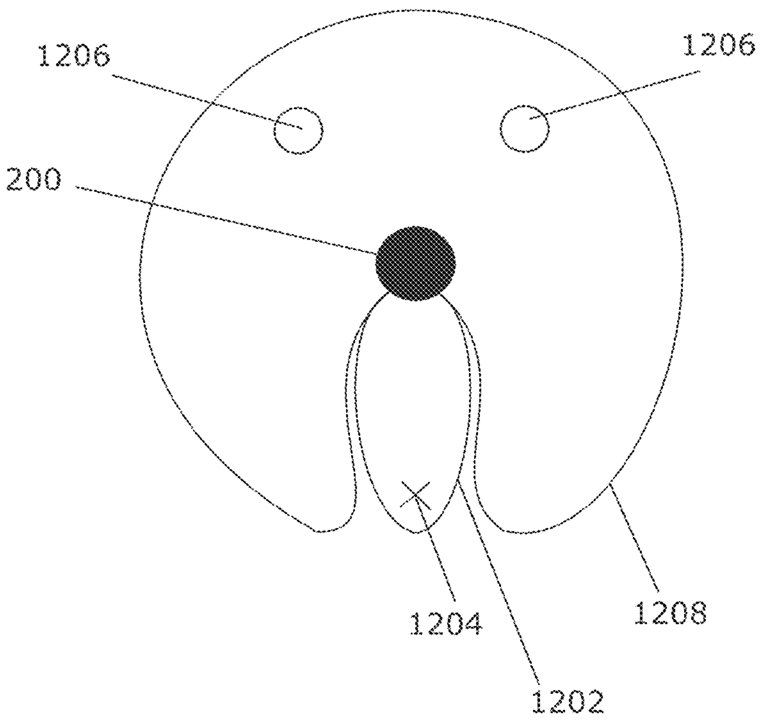
FIG. 12 shows the polar patterns of a noise-filtering application of the microphone array according to one example embodiment.
Figure 13:
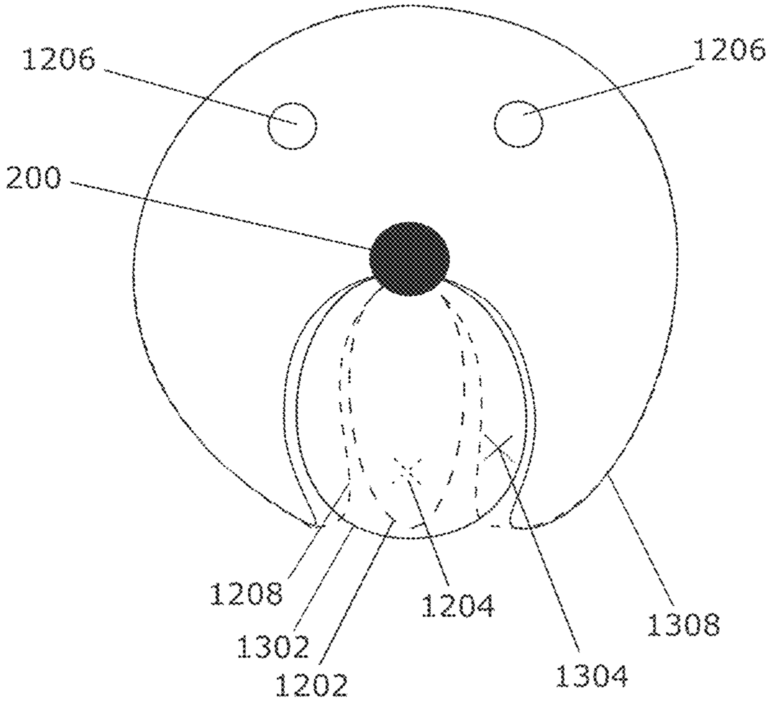
FIG. 13 shows the polar patterns of a noise-filtering application of the microphone array according to one embodiment, subjected to a beamwidth variation to account for a shift in the position of a target audio source.

If the target audio source 1204 moves out of the end-fire main beam, the beamforming configuration shown in FIG. 12 will not be as effective. As opposed to steering the end-fire main beam (which may result in unwanted side lobes), the beamwidth of the main beam 1202 and the null beam 1208 may both be varied to maintain effective operation of the noise-filtering algorithm. FIG. 13 shows a different beamforming configuration to that shown in FIG. 12. The main beam 1302 has a greater beamwidth than the main beam 1202 in order to account for the target audio source's shift in position from 1204 to 1304, so that the main beam 1302 captures the target audio source with higher sensitivity compared to the main beam 1202. Accordingly, the null beam 1308 now has a narrower beamwidth than the null beam 1208 to avoid an overlap between the main beam 1302 and the null beam 1308. The null beam 1208 may not need to be narrowed if the widening of the main beam 1202 would not result in an overlap.

Figure 14:
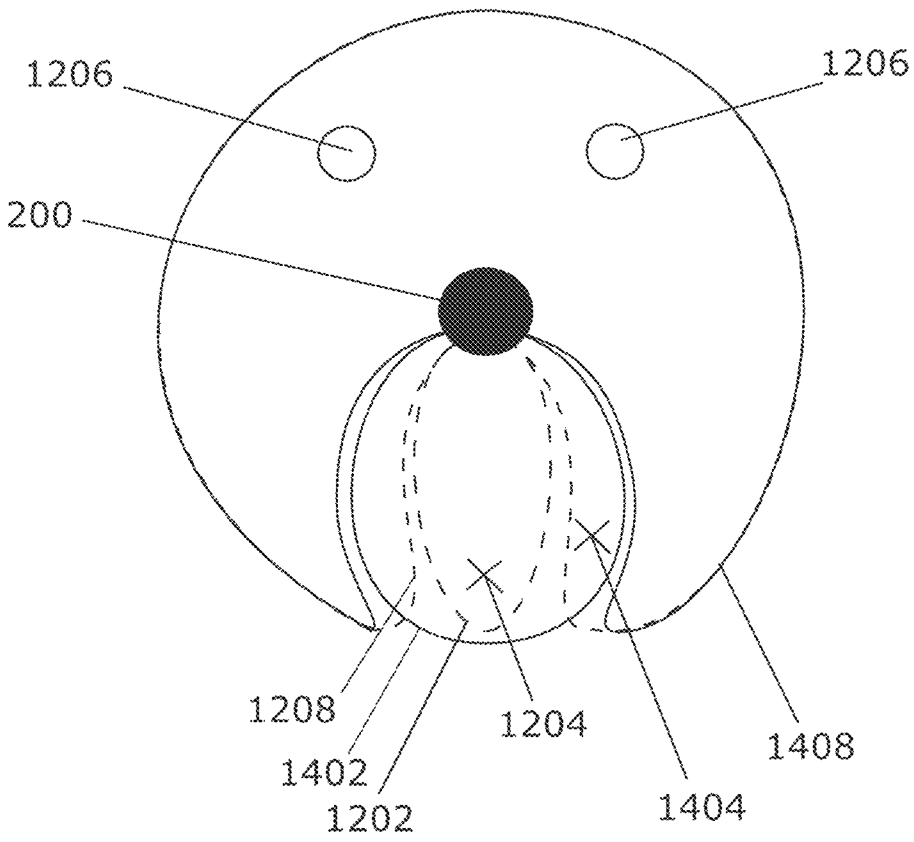
FIG. 14 shows the polar patterns of a noise-filtering application of the microphone array according to one embodiment, subjected to a beamwidth variation to account for a new target audio source.

A similar problem to that shown in FIG. 13 can arise if a second target audio source 1404 is identified outside the main beam 1202. As depicted in FIG. 14, the main beam is widened to give a new main beam 1402, so that the main beam 1402 captures the target audio source 1404 with higher sensitivity compared to the main beam 1202, and the null beam 1208 narrowed to a new null beam 1408 accordingly. The null beam 1208 may not need to be narrowed if the widening of the main beam 1202 would not result in an overlap.

The exact positioning of the audio sources is only exemplary. The utility of the beamformed microphone array in conjunction with the noise-filtering algorithm can be extended to scenarios where a target audio source moves to a different position than is shown in the figures, or if a new target audio source is identified in a different position than is shown in the figures, so long as varying the beamwidth of the main beam and/or the null beam can account for the positional change(s).

Figure 15:
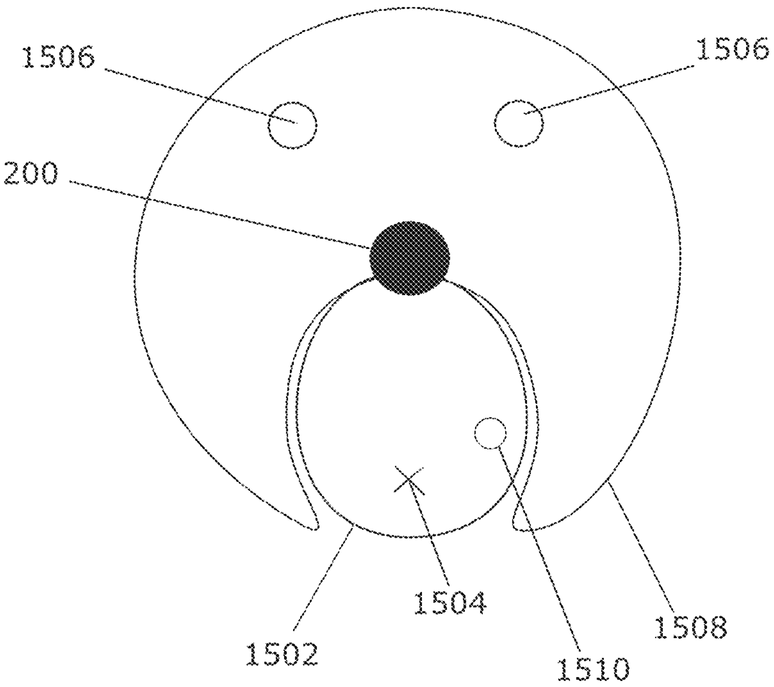
FIG. 15 shows the polar patterns of a noise-filtering application of the microphone array according to another embodiment.
Figure 16:
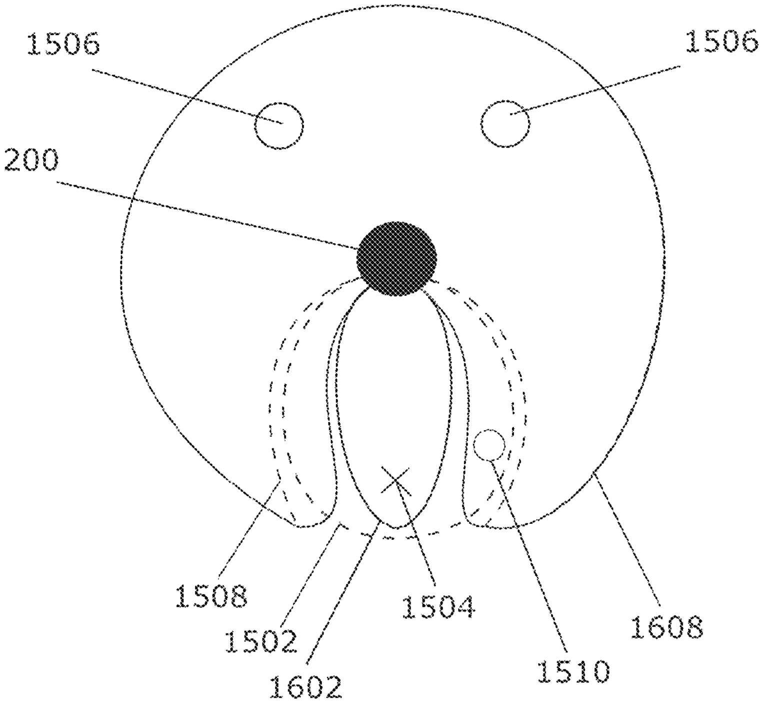
FIG. 16 shows the polar patterns of a noise-filtering application of the microphone array according to another embodiment, subjected to a beamwidth variation to account for a new noise source.
Figure 17:
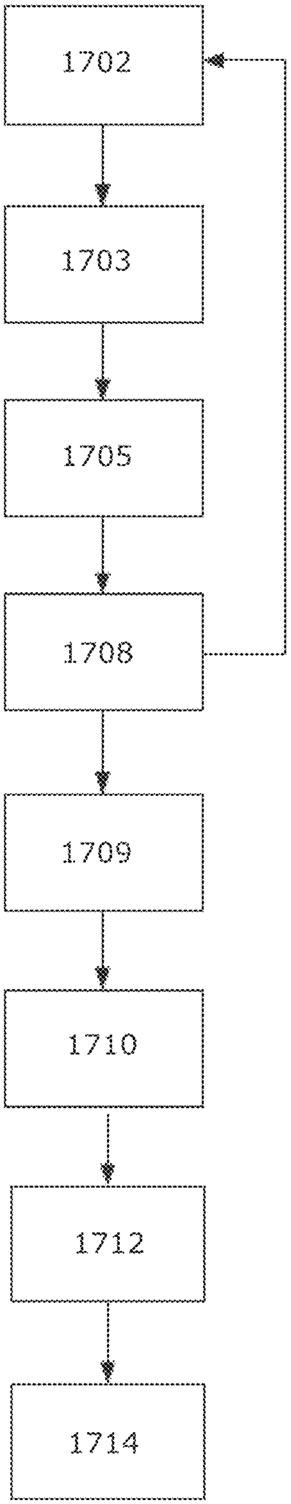
FIG. 17 is a flow diagram of a noise-filtering application of the microphone array according to an example embodiment.

In a related example depicted in FIGS. 15 and 16, a new noise source 1510 is identified in the main beam 1502. In this case, the null beam 1508 may be widened (have its beamwidth increased) to a new null beam 1608 so as to capture the new noise source 1510 with higher sensitivity compared to the null beam 1508, while still capturing the noise sources 1506. Accordingly, the main beam 1502 may be narrowed (have its beamwidth reduced) to a new main beam 1602, which would still be pointing at the target audio source 1504.

Employing a wide beam to capture additional target audio sources or additional noise sources may be preferable to beamforming additional beams. The provision of additional beams would render the computation more complex, incurring greater computational cost and potentially compromising numerical stability. This problem is exacerbated with increasing number of beams provided. By having a wide beam with approximately the same gain across the beamwidth, the additional sources in the wide beam may be abstracted as a single source, thereby allowing the noise-filtering algorithm to be more agnostic in respect of the physical set-up of the audio capture system.

UAV

In a further embodiment, one or more beamformed microphone arrays are mounted to an unmanned aerial vehicle (UAV). The UAV may not be a piloted passenger aircraft and may not comprise a jet engine. The UAV may include a battery power source and electric motors. Each electric motor may be directly coupled to a propeller. There may be a noise reducing shroud around each propeller that may include a layer of nanomaterials and/or melamine foam. The shell of each shroud may be carbon fibre or plastics. A microphone array may be located as part of a payload for the UAV. It may be connected to the UAV by a gimbal. In this way, the microphone array may be physically steerable with respect to the UAV.

The microphone array may be mounted to the UAV in the space that is within 10 degrees of the plane of the motor and propeller assembly. This is advantageous as the noise from the motor and propeller assembly is at a minimum in this space. The microphone array may be mounted towards the front or the back of the UAV (rather than the side) to maintain balance. The microphone array (or the gimbal to which it is attached) may be mounted via a connection configured to isolate vibrations.

Synergising with deliberate positioning of the microphone array on the UAV, an end-fire null beam may be beamformed to capture noise sources as determined by the particular audio recording application. Examples of noise include, but are not limited to, noise from a UAV motor and/or propeller assembly or wind noise. A target audio source(s) may be one or more animate or inanimate entities, which may be ground or airborne. As an example, a target audio source may be a speaker addressing a crowd at an outdoor rally. The UAV may additionally be configured to visually record one or more animate or inanimate entities, which may be the same one or more animate or inanimate entities as the target audio source(s).

The UAV may comprise a communications module. The communications module 110 of the microphone array system 100 may be the same module as UAV communications module, or the two communications module may be configured such that the microphone array system 100 need not establish a line of communication with the remote processing unit 112 separate from an existing line of communication between the UAV and a remote control device therefor. In one embodiment, the remote processing unit 112 is the remote control device for the UAV e.g. a ground station for the UAV.

Algorithm

The noise-filtering algorithm will now be described in detail with reference to a UAV-based application.

At step 1702, the direction of a target audio source relative to the system is detected. Microphone arrays can determine the angle of arrival of a sound wave by comparing the phase between microphones, or between different selected microphones. In one embodiment, the target audio source may include a radio transceiver which communicates its position to the system, from which the direction towards the target audio source can be detected. In another embodiment, a user may use a video feed to steer an image capturing device to the target audio source by ensuring target audio source is within the field of view of the image capturing device or this may be automated (e.g. the UAV may have a list of predetermined devices known to cause noise in an industrial setting and using image recognition it automatically searches for such devices within a predetermined geographic area, or it may target whatever the loudest noise is at the predetermined locations). The image capturing device may be mounted to the UAV via a gimbal that can be controlled so that the field of view of the image capturing device faces the target audio source. In another example, the image capturing device may be attached to the UAV, and so the user may move the UAV (by flying it to a certain position) so that the image capturing device faces the target audio source. By determining the relative direction of the image capturing device with respect to the system, it is possible to detect the direction of the target audio source.

At step 1703, the direction of a noise source relative to the system is detected. Where the primary noise source is the noise from the UAV's motor or propeller assembly, the relative direction will be known.

At step 1705, the sound capturing device will be implemented with a suitable first beamforming configuration such that an end-fire main beam is directed towards the target audio source and an end-fire null beam is directed towards the noise source.

At step 1708, the relative directions between the target audio source and noise source are determined.

At step 1709, the first beamforming configuration is changed to a second beamforming configuration if necessary. For example, the beamwidth of the main beam and/or the null beam may be varied in response to a positional change of one or more audio sources or if an additional audio source is identified.

At step 1710, target audio from the target audio source is captured using the sound capturing device and noise is captured from the noise source using the sound capturing device.

At step 1712, the parameters of a noise filtering algorithm are adjusted using the directional data obtained at step 1708.

At step 1714, filtered target audio is produced using the adjusted noise filtering algorithm.

In order that target audio is continually captured, the method may continually or periodically repeat steps 1702-1710 in case the target audio source moves with respect to the system.

Figure 18:
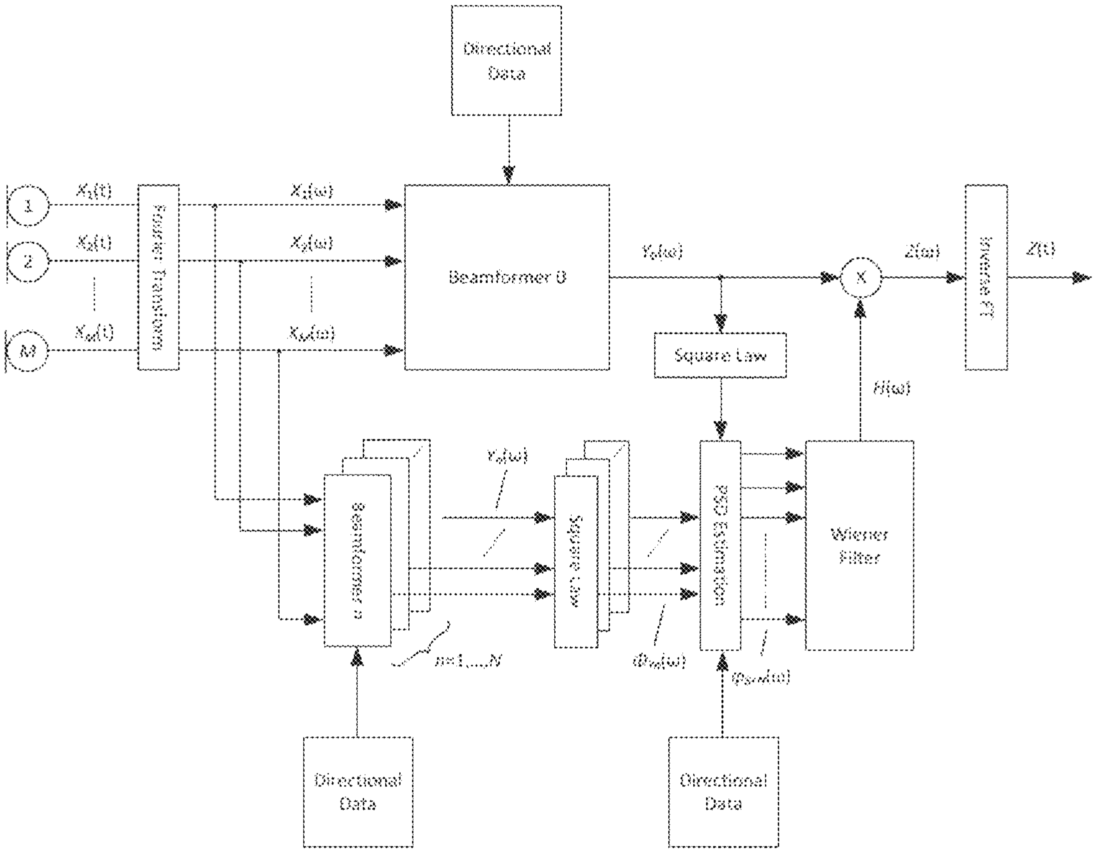
FIG. 18 is a diagram of a noise-filtering application of the microphone array according to an example embodiment.

FIG. 18 shows a schematic diagram of a method for producing filtered target audio Z(t) using a sound capturing device according to one embodiment. The sound capturing device includes an array of microphones (denoted 1, 2, . . . M), which each capture sound data in the time domain $X_1(t)$, $X_2(t)$, . . . $X_M(t)$. A Fourier transform is used to change the domain of the sound data to the frequency domain $X_1(\omega)$, $X_2(\omega)$, . . . $X_M(\omega)$.

The sound data $X_1(\omega)$, $X_2(\omega)$, . . . $X_M(\omega)$ is passed to Beamformer 0, which uses the directional data (for example, the directional data detected at step 1702 described above) to apply a suitable beamforming configuration so that the resulting target audio beam $Y_0(\omega)$ is directed towards the target audio source.

The sound data $X_1(\omega)$, $X_2(\omega)$, . . . $X_M(\omega)$ is also passed to beamformers n, which use the directional data (for example, the directional data detected at step 1703 described above) to apply a suitable beamforming configuration so that the resulting noise beam(s) $Y_n(\omega)$ is directed towards the noise source(s).

The target audio beam $Y_0(\omega)$ and noise beam $Y_n(\omega)$ are provided to a square law unit which calculates the energy magnitude per frequency bin for each beam. The resulting data is supplied to a PSD Estimation unit which estimates the PSD for each beam. This may be done using the Welch method. The Welch method relies on directivity data. The directivity data may be precalculated from impulse response system characterisation. The PSD Estimation unit uses directional data to select the appropriate data when estimating the PSD for each beam.

The PSD Estimation units produces weights, which are supplied to a suitable filter such as a Wiener filter, which produces filter $H(\omega)$ that is applied to the target audio beam $Y_0(\omega)$. An inverse Fourier transform converts to the time domain, producing the filtered target audio Z(t).

While the sound capturing device will continually capture sound data $X_1(t)$, $X_2(t)$, . . . $X_M(t)$, as the relative direction of the target source with respect to the noise changes (for example, due to a moving target source), new beamforming configurations and PSD estimations are applied, thereby improving the filtered target audio Z(t).

Though the above description is given with reference to a UAV application, the beamformed microphone array system in conjunction with the noise-filtering algorithm may be applied to numerous other applications in a similar manner. At a sporting event or a concert, for example, the null beam may capture noise sources such as the crowd while the main beam may be directed at a commentator or a performer.

Noise Detection Applications

Aside from noise-filtering applications, the beamformed microphone array system may also be used for noise detection. The beamforming capability of the system may prove advantageous compared to fixed microphone set-ups. For example, it may be desirable to dynamically change the audio capture area, in which case the beamwidth may simply be varied as described hereinbefore. It will also be understood that the beamforming arrangement need not be limited to the end-fire beam.

Possible noise detection applications include, but are not limited to, ground vehicle (manned or unmanned) positioning, aerial vehicle (manned or unmanned) identification, animal detection, gunshot detection, and security and surveillance.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method of beamforming for a plurality of linear microphone arrays within a three-dimensional housing, comprising:

storing a desired end-fire beam response including a beamwidth specification;

determining and storing diffraction behaviors around a microphone array of the plurality of linear microphone arrays;

compensating for the diffraction behaviors by including a diffraction compensation factor;

determining an error data set from the stored end-fire beam response and the diffraction compensation factor; and determining beamforming weights based on a least squares minimization of the error data set.

2. The method of claim 1, further comprising weighting the error data set.

3. The method of claim 1, further comprising regularizing the least squares minimization of the error data set.

4. The method of claim 1, further comprising an inverse Fourier transformation and a convolution operation.

5. The method of claim 1, wherein the beamforming weights low-pass filter the response of a first microphone of the microphone array with a first cut-off frequency and low-pass filter the response of a second microphone of the microphone array with a second cut-off frequency different from the first cut-off frequency, wherein the microphone array has a center, the first microphone is closer to the center than the second microphone, and the first cut-off frequency is higher than the second cut-off frequency.

6. The method of claim 1, wherein the beamwidth of an end-fire beam beamformed using the determined beamforming weights varies by no more than 50% across the frequency range of 2000 Hz to 16000 Hz.

7. The method of claim 1, wherein the stored desired end-fire beam response is part of a noise-filtering algorithm and is a first main beam, further comprising storing a second beam response including a beamwidth specification different from the beamwidth specification of the stored desired end-fire beam response, wherein the second beam response is also part of the noise-filtering algorithm and is also an end-fire main beam.

8. The method of claim 1, wherein the stored desired end-fire beam response is part of a noise-filtering algorithm and is a first null beam, further comprising storing a second beam response including a beamwidth specification different from the beamwidth specification of the stored desired end-fire beam response, wherein the second beam response is also part of the noise-filtering algorithm and is also a null beam.

9. The method of claim 1, further comprising compensating for diffraction behaviors of the physical microphone array structure.

10. A non-transitory computer readable medium having stored thereon software instructions that, when executed by a processing unit, cause the processing unit to perform the method of claim 1.

11. A system, comprising:

a processing unit; and a microphone array comprising a plurality of linear microphone arrays within a three-dimensional housing;

wherein the processing unit is configured to receive audio from the plurality of linear microphone arrays and apply the method of beamforming of claim 1 to the received audio to generate an end-fire beam.

12. The system of claim 11, wherein the processing unit is in the same physical package as the microphone array.

13. The system of claim 11, wherein the processing unit is a ground station.

14. The system of claim 11, wherein the processing unit is configured to sum outputs of one or more microphones of the plurality of linear microphone arrays.

15. The system of claim 11, wherein the processing unit is configured to beamform multiple beams, and wherein a second beam of the multiple beams is wider than the end-fire beam.

16. The system of claim 15, wherein the end-fire beam is more sensitive than the second beam to the position of a target audio source, and the second beam is more sensitive than the end-fire beam to the position of a noise source.

17. The system of claim 16, wherein the processing unit is further configured to execute a noise-filtering algorithm that uses the second beam to reduce the power of any noise signal of the noise source captured by the end-fire beam, and wherein the end-fire beam is an end-fire main beam.

18. The system of claim 11, further comprising a plurality of filters, each filter is configured to receive a respective output signal from a respective linear microphone array of the plurality of linear microphone arrays, each filter is configured to have at least one associated coefficient or constant, and wherein a plurality of filtered signals output from each of the plurality of filters are configured to be combined into a smaller subset of beamformer outputs; and a user beamformer selection input configured to receive a user selection, and depending on the selection to adjust the coefficient or constant associated with each filter to achieve a desired smaller subset of beamformer outputs and/or resulting beamforming pattern.

19. The system of claim 18, further comprising a control housing;

a data connection between the microphone housing and the control housing;

a processor within the control housing or the microphone housing configured to form an end-fire beam response from the outputs of the plurality of linear microphone arrays; and one or more user input devices on the control housing configured to adjust the end-fire beam.

20. The system of claim 19, further comprising an output providing an end-fire beam response from the smaller subset of beamformer outputs, wherein the sidelobe response of the output is considerably lower than an interference tube shotgun mic.

* * * * *